US011990120B2

(12) United States Patent
Grizzel

(10) Patent No.: US 11,990,120 B2
(45) Date of Patent: *May 21, 2024

(54) NON-SPEECH INPUT TO SPEECH PROCESSING SYSTEM

(71) Applicant: Amazon Technologies, Inc., Seattle, WA (US)

(72) Inventor: Travis Grizzel, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/902,992

(22) Filed: Jun. 16, 2020

(65) Prior Publication Data

US 2021/0035552 A1 Feb. 4, 2021

Related U.S. Application Data

(63) Continuation of application No. 15/389,742, filed on Dec. 23, 2016, now Pat. No. 10,692,485.

(51) Int. Cl.
*G10L 15/01* (2013.01)
*G06F 3/01* (2006.01)
*G10L 13/00* (2006.01)
*G10L 15/18* (2013.01)
*G10L 15/187* (2013.01)
*G10L 15/24* (2013.01)
*G10L 15/08* (2006.01)

(52) U.S. Cl.
CPC ............. *G10L 15/01* (2013.01); *G06F 3/017* (2013.01); *G10L 13/00* (2013.01); *G10L 15/18* (2013.01); *G10L 15/187* (2013.01); *G10L 15/24* (2013.01); *G10L 2015/088* (2013.01)

(58) Field of Classification Search
USPC ........................ 704/246, 247, 251, 252, 255
See application file for complete search history.

(56) References Cited

U.S. PATENT DOCUMENTS

| 10,275,529 B1* | 4/2019 | Cronin ............... G06F 16/3329 |
| 10,282,057 B1* | 5/2019 | Binder .................... G06F 3/017 |
| 2008/0086754 A1* | 4/2008 | Chen ............... H04N 21/21815 725/105 |
| 2014/0173440 A1* | 6/2014 | Dal Mutto ............. G06F 3/167 715/728 |

(Continued)

*Primary Examiner* — Leonard Saint-Cyr
(74) *Attorney, Agent, or Firm* — Pierce Atwood LLP

(57) ABSTRACT

A system and method for associating motion data with utterance audio data for use with a speech processing system. A device, such as a wearable device, may be capable of capturing utterance audio data and sending it to a remote server for speech processing, for example for execution of a command represented in the utterance. The device may also capture motion data using motion sensors of the device. The motion data may correspond to gestures, such as head gestures, that may be interpreted by the speech processing system to determine and execute commands. The device may associate the motion data with the audio data so the remote server knows what motion data corresponds to what portion of audio data for purposes of interpreting and executing commands. Metadata sent with the audio data and/or motion data may include association data such as timestamps, session identifiers, message identifiers, etc.

20 Claims, 24 Drawing Sheets

(56) References Cited

U.S. PATENT DOCUMENTS

| | | | |
|---|---|---|---|
| 2014/0371955 A1* | 12/2014 | Vaghefinazari | G01C 21/3664 701/2 |
| 2015/0012426 A1* | 1/2015 | Purves | G02B 27/017 705/41 |
| 2015/0177841 A1* | 6/2015 | VanBlon | G06F 3/0346 715/863 |
| 2015/0336588 A1* | 11/2015 | Ebner | G01C 21/3664 701/2 |
| 2016/0109954 A1* | 4/2016 | Harris | G06F 3/011 345/156 |
| 2017/0316258 A1* | 11/2017 | Hoy | G06K 9/00771 |
| 2017/0316260 A1* | 11/2017 | Hoy | G06K 9/00771 |
| 2018/0062691 A1* | 3/2018 | Barnett, Jr. | G06F 3/167 |

\* cited by examiner

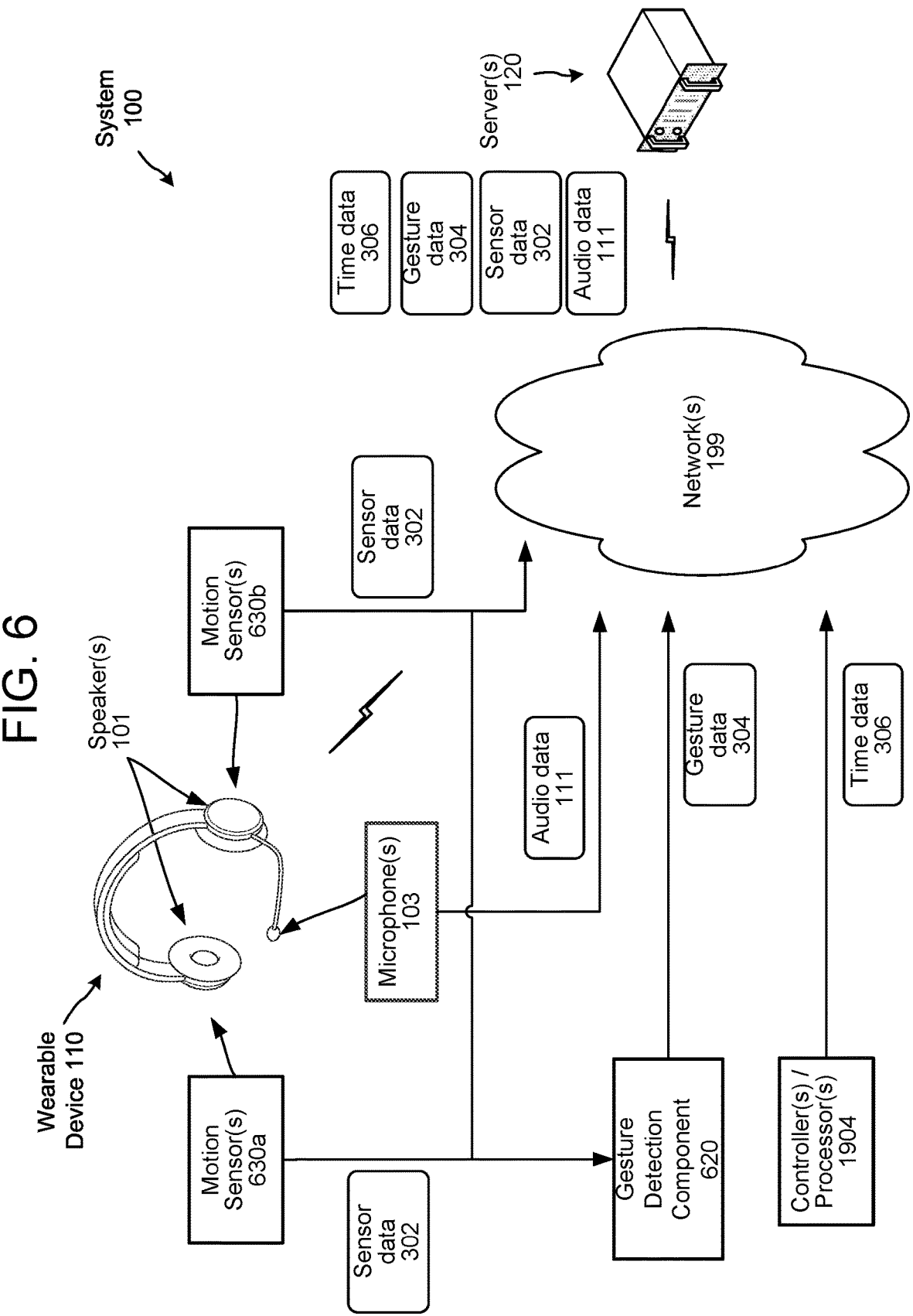

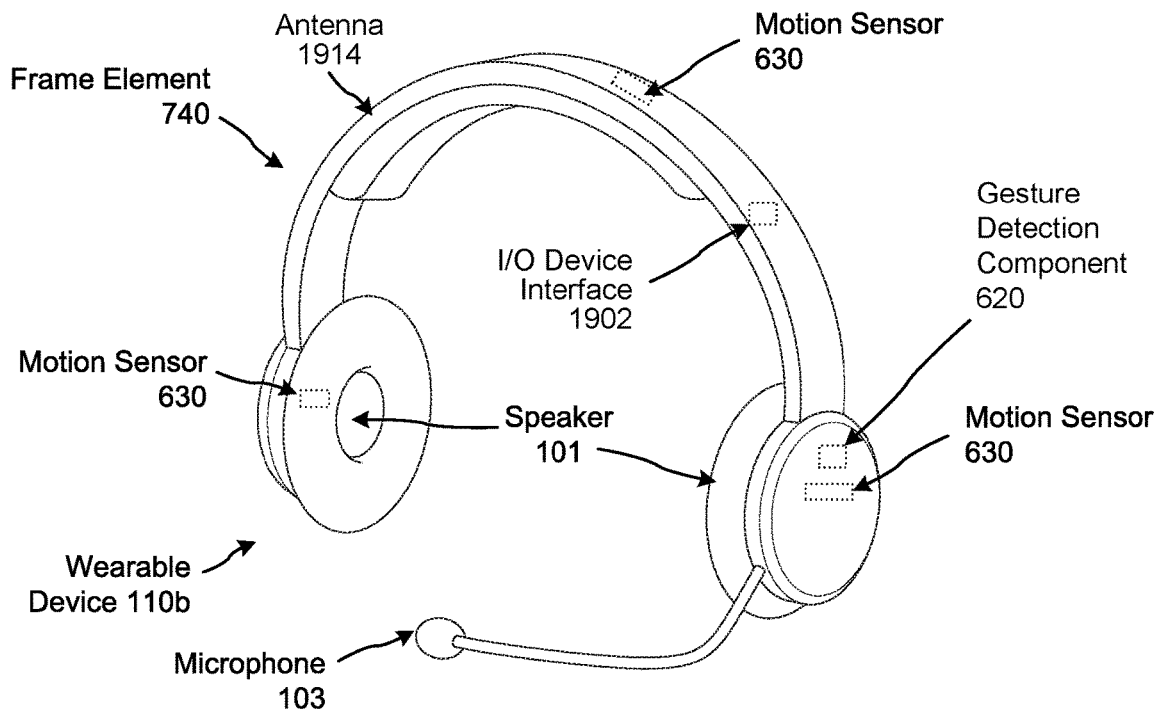
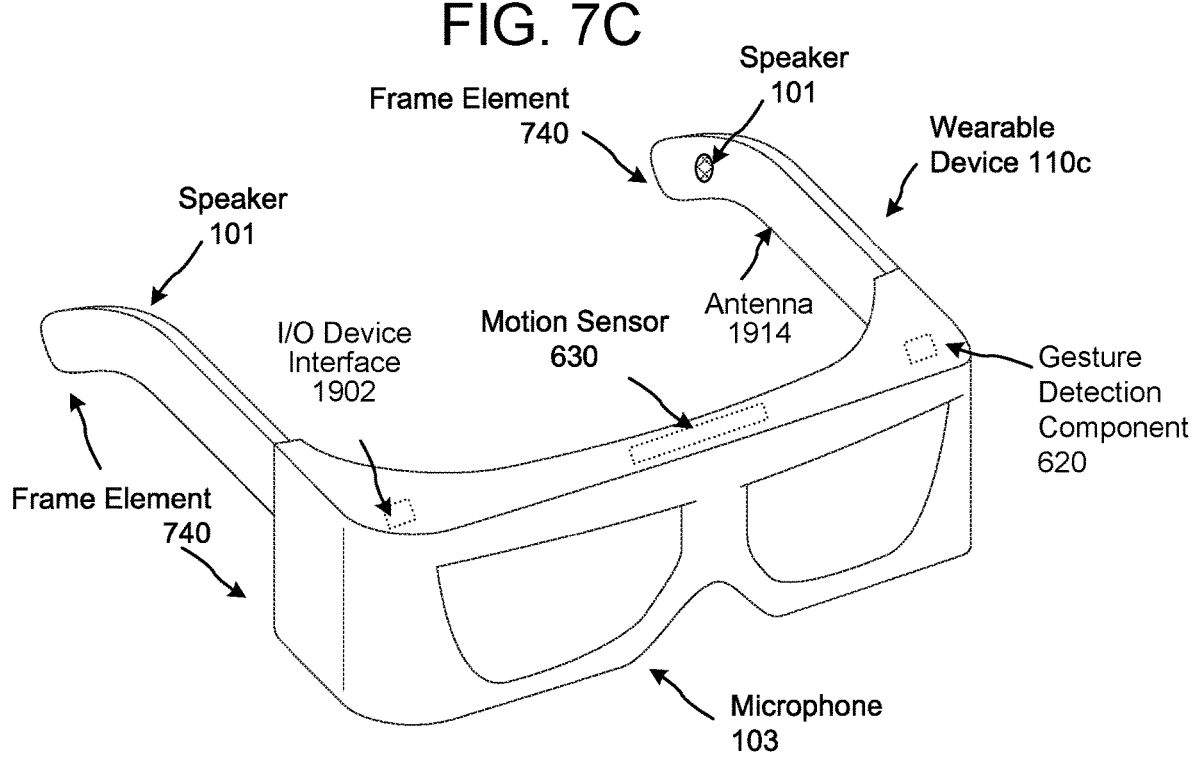

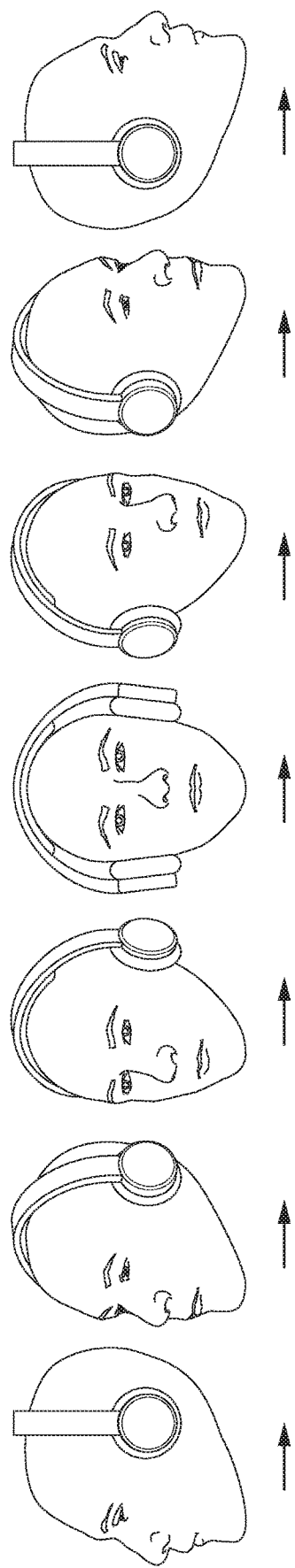
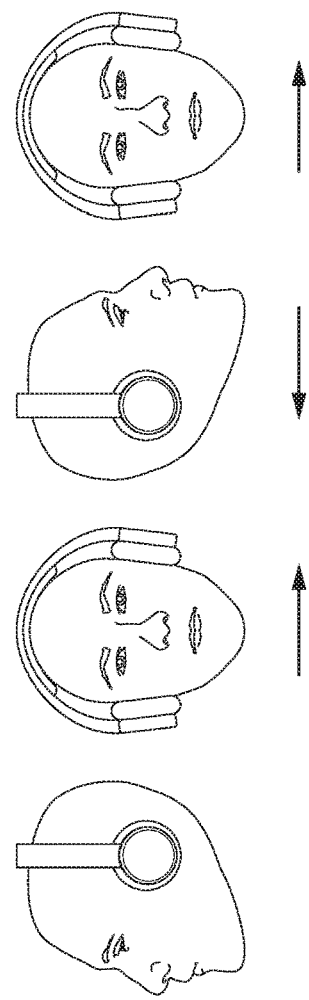
FIG. 9A
FIG. 9B

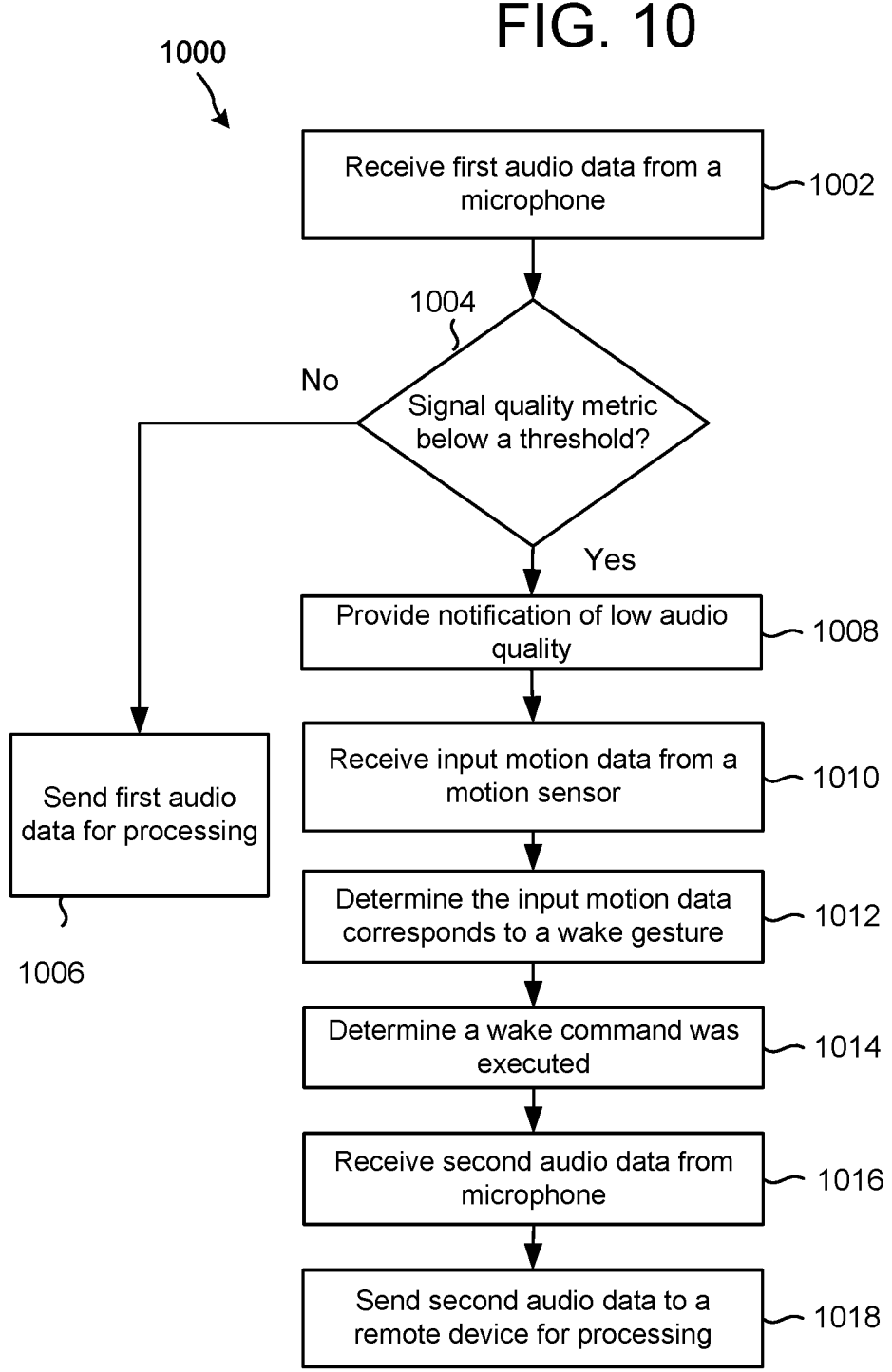

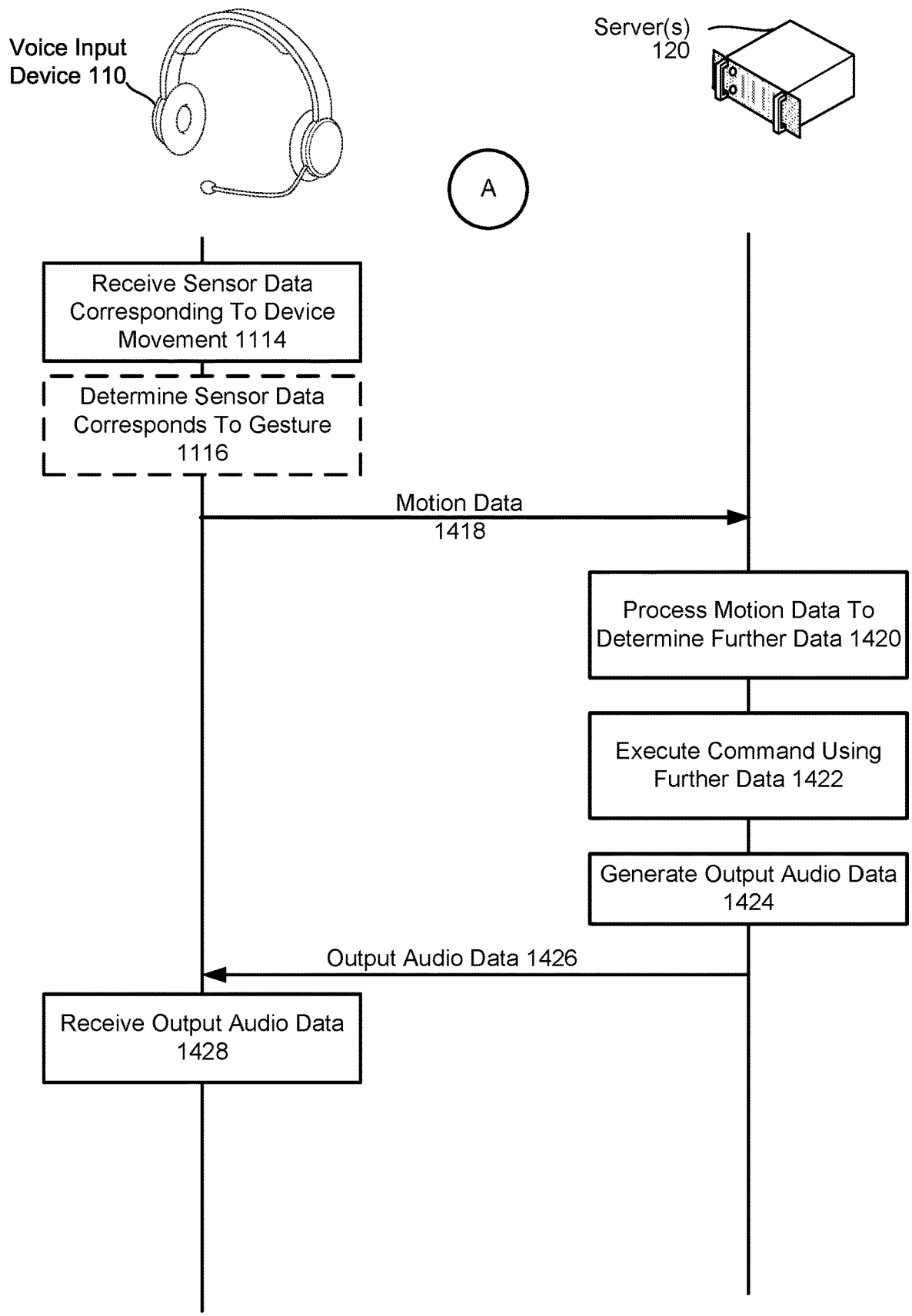

NON-SPEECH INPUT TO SPEECH PROCESSING SYSTEM

CROSS-REFERENCE TO RELATED APPLICATION

This application is a continuation of, and claims the benefit of priority of, U.S. Non-provisional patent application Ser. No. 15/389,742, filed on Dec. 23, 2016 and entitled "NON-SPEECH INPUT TO SPEECH PROCESSING SYSTEM," scheduled to issue as U.S. Pat. No. 10,692,485, the contents of which is expressly incorporated herein by reference in its entirety.

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 illustrates a system for a device to communicate with a speech-command system to send both audio data and motion data according to embodiments of the present disclosure.

FIGS. 7A-7C illustrate example diagrams of wearable devices according to embodiments of the present disclosure.

FIGS. 9A-9D illustrates example operation of a wearable device with motion sensor(s) according to embodiments of the present disclosure.

FIG. 10 illustrates an exemplary method of determining a wake command using motion data according to embodiments of the present disclosure.

FIGS. 14A-14B are a signal flow diagram illustrating incorporating motion data into a voice-based interaction between a voice input device and a server.

DETAILED DESCRIPTION

Figure 1:
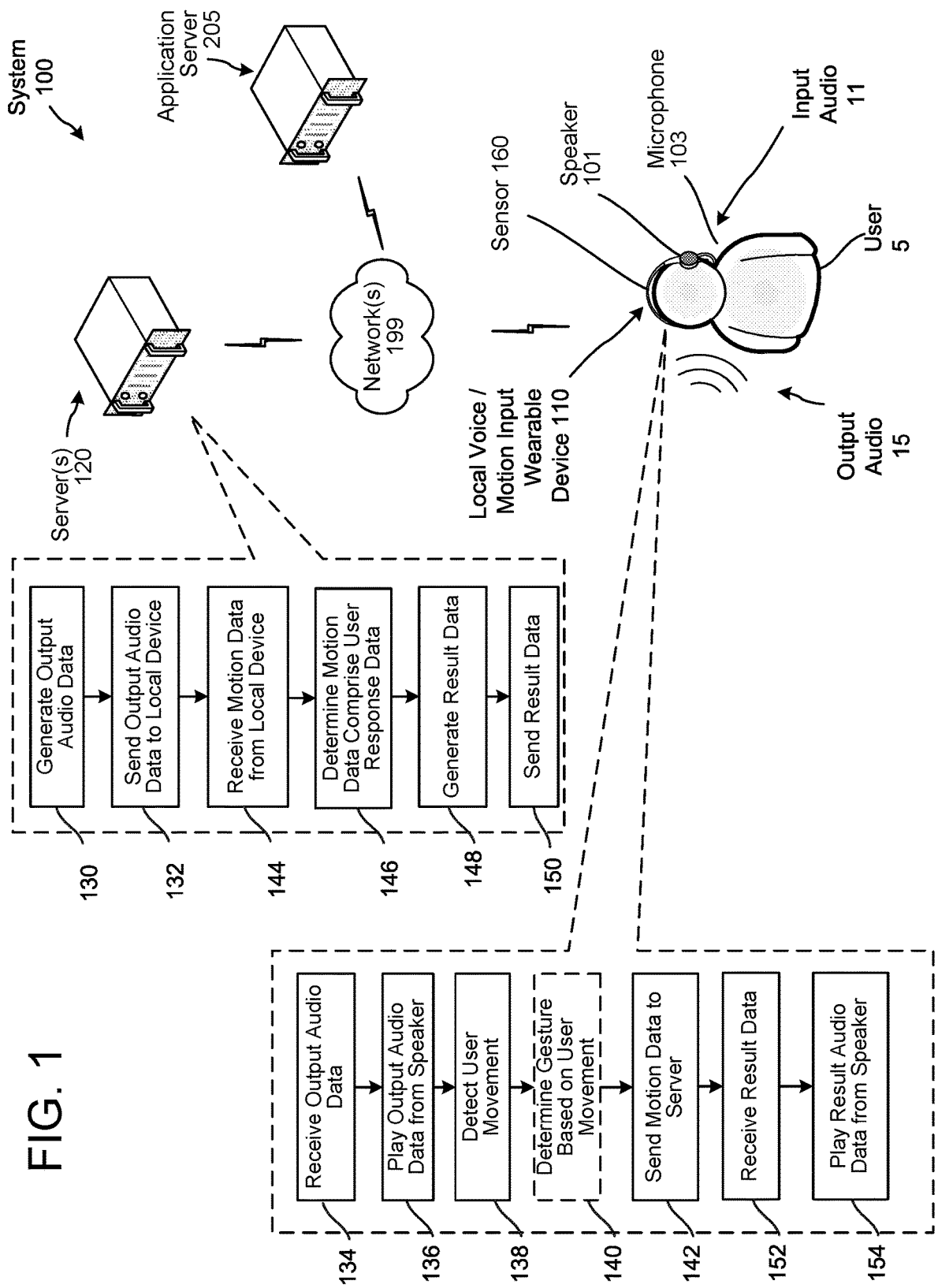
FIG. 1 illustrates a system for receiving motion input as part of interactions with voice input devices according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus a spoken language processing system may include an ASR component that receives audio input of a user utterance and generates one or more likely transcriptions of the utterance and may also include a NLU component that receives textual input, such as a transcription of a user utterance, and determines the meaning of the text in a way that can be acted upon, such as by a computer application.

A speech processing system may be configured as a relatively self-contained system where one device captures audio, performs speech processing, and executes a command corresponding to the input speech. Alternatively, a speech processing system may be configured as a distributed system where a number of different devices combine to capture audio of a spoken utterance, perform speech processing, and execute a command corresponding to the utterance. Although the present application describes a distributed system, the teachings of the present application may apply to any system configuration.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture sounds from a user speaking and convert those sounds into an audio signal or other types of data. The audio signal/data may then be sent to one or more downstream remote devices for further processing, such as converting the audio signal into an ultimate command. For example, one or more different servers may combine to perform ASR, one or more different servers may combine to perform NLU, and so on. The command may then be executed by one or a combination of remote and local devices depending on the command itself.

The device that captures spoken audio from a user may take one or more forms. For example an appliance-type device that resides in a user's home, a mobile device (such as a phone or tablet) that may travel with a user, or even a wearable device such as a headset, a smart brooch, a network-connected hearing aid, or other type of wearable microphone-enabled device. In certain circumstances, a local wearable device may be configured to receive an utterance from a user in a noisy and crowded environment. The user may speak the utterance as part of initiation of a command. The user may also speak another input as a result of being prompted by the system to provide feedback or answer a question that is being processed by the system. Communications in a noisy environment may suffer from low signal-to-noise ratio (SNR), difficulty understanding the user, reduced privacy, or other issues inherent in speaking commands to a computing system in a crowded situation. A low signal-to-noise ratio may diminish the quality of the audio data of the user's response as detected by a microphone of the user's local device. Further, privacy concerns may make it undesirable for the user to answer certain questions or provide certain information (such as passwords, account information, etc.) in response to system prompts if the user is around other people. A still further drawback is that if a local device continually sends audio to a remote device, the system may waste significant computing resources processing all incoming audio when no commands are being issued in the majority of the audio and/or the quality of the audio is below an acceptable threshold.

To account for these problems, a local device (e.g., wearable device, etc.) may be configured to detect movement of the local device, such as when the movement corresponds to user movement while wearing the local device. The local device may include a plurality of sensors to detect multiple types of movements of the local device. The movement may then be used to provide input to the speech-processing system thus enabling the user to respond to the system not only with spoken commands but also with physical gestures, for example a head nod, head shake, etc. For example, the local device may receive audio data from a remote device, which when output as audio to the user, prompts the user to answer a question in the affirmative or negative (e.g., yes or no, etc.). In a noisy environment, the signal-to-noise ratio of the user's response may be below an acceptable threshold for the remote device to determine the content and/or intent of the user's response. Therefore, the user may utter a response and/or may indicate a non-verbal response by moving a body part that the local device (or wearable device) is attached thereto. For example, if the user wishes to respond yes, the user may nod his or her head. The user's movement indicating the response may be detected by the local device (for example the wearable headphones) and converted to movement and/or gesture data to be sent to the remote device for processing. The remote device may then receive the movement and/or gesture data and can determine the intent and/or content of the user's response, even without receiving responsive audio data or if the audio data generated from the user's audible response is of poor quality (i.e., does not exceed a quality threshold). A local device may also receive a wake command from the user based on motion data generated by a user movement or user gesture corresponding to the wake command.

While a device may be operable for certain processing (e.g., detecting motion, playing music, etc.) it may not be configured to capture and send audio to a remote device for speech processing. To enable a device to capture and send audio to a remote device for speech processing (or otherwise process audio for speech processing), a wake command may be executed. A wake command is a command for a device of the speech-controlled system to capture audio of a spoken utterance for purposes of processing and execution of a command included in the utterance. In traditional speech-controlled systems the wake command may be a wakeword which is spoken to, and recognized by, a local device, which then captures the audio for an utterance and either processes it or forwards audio data of the utterance to another device for processing. The local device may continually listen for the wakeword and may disregard any audio detected that does not include the wakeword or is not preceded by the wakeword.

Typically, systems are configured to detect a wake command, such as a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would send audio data corresponding to that subsequent audio to a remote device (or maintain it locally) to perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

In the present disclosure, however, the wake command may be a physical wake command (which may be referred to as a wake gesture). The physical wake command may be detected by the local device receiving motion data from motion sensors of the local device (and potentially a gesture processing component or other component) and the motion data may be interpreted as a command for the system to capture a forthcoming spoken utterance and/or perform further processing (which may involve interpreting a command in an utterance and/or a command indicated by a physical gesture). Thus, in addition to being activated by a wakeword, the system may be activated by a wake gesture. For example, the local device may continually scan motion sensors of the local device for motion data corresponding to a wake gesture. The wake gesture may be a movement based input corresponding to a wake command. The wake gesture may by detectable by motion sensors disposed within the local device. The system may detect the wake gesture by receiving motion data generated by motion sensors of the local device. Once the wake gesture is detected, systems are configured to process any subsequent audio following the wake gesture (plus perhaps a fixed, but short amount of motion pre-wake gesture) to detect any commands in the subsequent motion data.

Movement profiles may be provided corresponding to two motion sensors to make sure the wearable device is moving in the expected manner to be input into the NLU engine. The motion data generated by a first motion sensor may be compared with motion data generated by a second motion sensor to determine a corresponding speech-based indicator. The speech-based indicator may be a "yes" indicator or a "no" indicator.

Movement profiles corresponding to data generated by motion sensors may be stored within a device and compared to incoming sensor data to determine if the sensor data matches a movement profile. When a movement profile is matched, the device may determine that a particular gesture corresponding to the matched movement profile has been executed.

Another function of motion data detected by the local device is to respond to a question presented by the local device, wherein the response includes audio data and/or motion data. For example, the local device may output audio data from speakers of the local device to the user, wherein the output audio data may correspond to a question posed to the user by the system. The user may respond by uttering a response as audio input to the local device and/or making a motion as movement input to the local device. The audio input may be detected by a microphone and the movement input may be detected by a motion sensor. The audio input may be converted to audio input data and the movement input may be converted to movement input data. Both the audio input data and the movement input data may be sent to a remote device for processing. The motion data may include raw (or processed) sensor data, an indication of a gesture, or otherwise. Alternatively, the audio input data and the movement input data may be processed by the local device. However, the system may ultimately perform processing on the audio input data and/or the movement input data to generate a result.

FIG. 1 shows a speech processing system 100 capable of detecting motion data corresponding to a user input and use the motion data to determine and/or execute a command. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more wearable devices 110 configured to process voice and motion inputs that are local to the user 5, as well as one or more network(s) 199. The server(s) 120 (which may be one or more different physical devices) may be capable of performing traditional speech processing (e.g., ASR, NLU, command processing, etc.) and/or movement processing as described herein. A single server 120 may perform all speech/movement processing or multiple servers 120 may combine to perform all speech/movement processing. Further, the server(s) 120 may execute certain commands, such as answering spoken utterances of the user 5 and/or responding to certain motion data of the device 110. In addition, certain speech/motion detection or command execution functions may be performed by the voice input device 110.

In one example, as shown in FIG. 1, a system 100 may generate (130) output audio data in response to receiving a first command (not shown) uttered by the user 5. The output audio data may be sent (132) to a local device 110 (e.g., wearable device, hearable device, etc.) via one or more network(s) 199. The output audio data 151 may be received (134) at the local device 110 and played (136) from a speaker 101 connected to the local device 110. The local device 110 may detect (138) movement of user by detecting movement of the local device 110 using one or more motion sensors 630 (discussed below). Motion data may be determined (140) based on the movement. The motion data may be sent (142) or transmitted to the server(s) (e.g., remote device, etc.) via the network(s) 199 and the server(s) 199 may receive (144) the motion data from the local device 110. The remove device (e.g., server (120)) may be configured to receive motion data from the local device 110. It may be determined that the motion data comprises user response data (146), wherein the user response data may correspond to an ambiguity in the original command. For example, the response data may correspond to a response to a question or a query from the system (such as a query represented in the output audio data) and may represent a binary response (e.g., yes or no). The server(s) 120 may perform motion/movement processing (148) on the user response data to generate a result. For example, if the motion data corresponds to a head nod the system may interpret the motion data as a "yes" response whereas if the motion data corresponds to a head shake the system may interpret the motion data as a "no" response. The system may then complete execution of a command using the affirmative or negative response to generate (148) result data for the command. The result may be generated by an application server 125 and sent to the local device 110 via the one or more network(s) 199 or may be routed through the server(s) 120. The generated result data may be sent (150) to the local device 110. The result data may comprise audio data. The local device 110 may receive the results from the server(s) 120 and play or output (154) the result as output audio 15 from the speaker 101.

Figure 2:
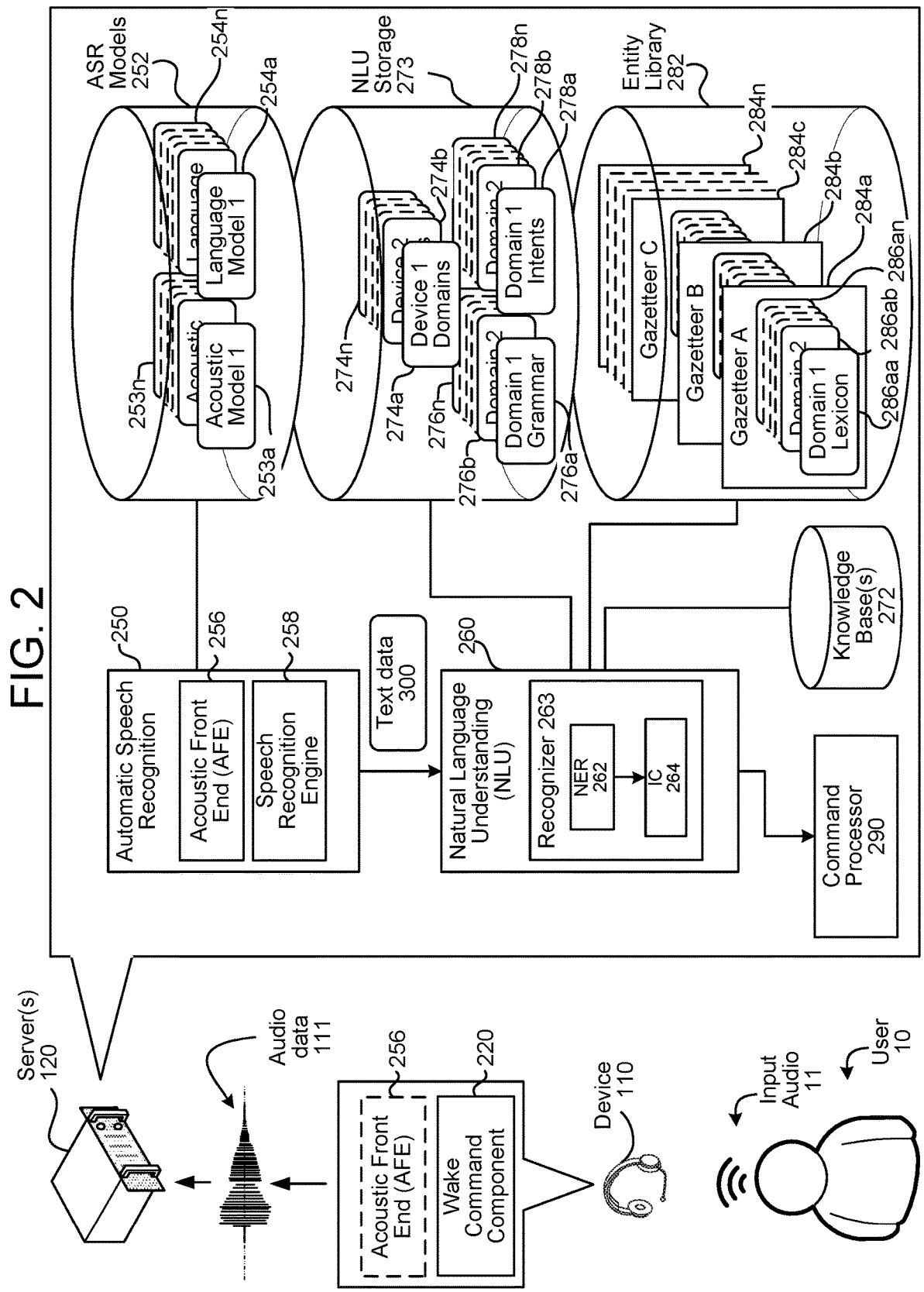
FIG. 2 is a conceptual diagram of a speech processing system.

Further details of the system 100 configured to process motion data are explained below, following a discussion of the overall speech processing system of FIG. 2. The system 100 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as the microphone 103 of the voice input device 110 (or other device), captures input audio 11 corresponding to a spoken utterance. The device 110, using a wake command detection component 220, then processes audio data corresponding to the input audio 11 to determine if a keyword (such as a wakeword) is detected in the audio data. Following detection of a wakeword, the voice input device 110 sends audio data 111, corresponding to the utterance, to a server 120 that includes an ASR component 250. The audio data 111 may be output from an acoustic front end (AFE) 256 located on the device 110 prior to transmission, or the audio data 111 may be in a different form for processing by a remote AFE 256, such as the AFE 256 located with the ASR component 250.

The wake command detection component 220 works in conjunction with other components of the voice input device 110, for example the microphone 103, to detect keywords in audio data corresponding to the input audio 11. For example, the voice input device 110 may convert input audio 11 into audio data, and process the audio data with the wake command detection component 220 to determine whether speech is detected, and if so, if the audio data comprising speech matches an audio signature and/or model corresponding to a particular keyword.

The voice input device 110 may use various techniques to determine whether audio data includes speech. Some embodiments may apply voice activity detection (VAD) techniques. Such techniques may determine whether speech is present in input audio based on various quantitative aspects of the input audio, such as a spectral slope between one or more frames of the input audio; energy levels of the input audio in one or more spectral bands; signal-to-noise ratios of the input audio in one or more spectral bands; or other quantitative aspects. In other embodiments, the voice input device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the input audio to one or more acoustic models in speech storage, which acoustic models may include models corresponding to speech, noise (such as environmental noise or background noise), or silence. Still other techniques may be used to determine whether speech is present in the input audio.

Once speech is detected in the input audio 11, the voice input device 110 may use the wake command detection component 220 to perform wakeword detection to determine when a user intends to speak a command to the voice input device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake command detection component 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword detection builds HMMs for each wakeword and non-wakeword speech signal respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN)-HMM decoding framework. In another embodiment the wakeword detection system may be built on DNN/recursive neural network (RNN) structures directly, without HMM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In addition to being configured to detect a spoken wakeword, as noted below, the wake command detection component 220 may also be configure to detect a wake gesture, which is a physical action made by a user to wake the device 110 for purposes of capturing audio for speech processing. As described below, the wake gesture may be a particular physical moving of the device 110 (for example, if the device 110 is a headset, nodding a head twice while wearing the headset may be interpreted as a wake gesture/wake command) or the wake gesture may be a physical movement of the user otherwise detectable by the device (for example, a user waving a hand in a particular manner that is captured by a camera of the device 110).

Once the wake command is detected, the voice input device 110 may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data corresponding to the wakeword may be removed by the voice input device 110 prior to sending the audio data 111 to the server(s) 120.

Upon receipt by the server(s) 120, an ASR component 250 may convert the audio data 111 into text data. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR component 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text recognized in the audio data 111. The ASR component 250 may also output multiple hypotheses in the form of a lattice or an N-best list with each hypothesis corresponding to a confidence score or other score (e.g., such as probability scores, etc.).

The device or devices (e.g., the server(s) 120) including the ASR component 250 may include an AFE 256 and a speech recognition engine 258. The AFE 256 transforms the audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the voice input device 110 may process audio data 111 into feature vectors (e.g., using an on-device AFE 256) and transmit the feature vector data to the server(s) 120 across the network(s) 199 for ASR processing. Feature vector data may arrive at the server(s) 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output speech results that make sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the voice input device 110, the server 120, or another device (e.g., a server running a search engine, etc.)

The device performing NLU processing (e.g., the server 120) may include various components, including potentially dedicated processor(s), memory, storage, etc. The device performing NLU processing may include a dedicated NLU component/component 260, which may include a named entity recognition (NER) component 262 and intent classification (IC) component 264. The device performing NLU processing may additionally include NLU storage 273 and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways.

The NLU component 260 takes text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the voice input device 110, the server(s) 120, an application server 125, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of input speech, the NLU component 260 may be configured to determine a "domain" of the speech so as to determine and narrow down which services offered by an endpoint device (e.g., the server(s) 120, the voice input device(s) 110, an application server(s) 125, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from a contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the voice input device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. Each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored, with the overall highest ranked result from all applied domains being ordinarily selected to be the correct result. This is described further in detail below in reference to FIG. 3.

An IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HIVIMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the voice input device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text data, commands, etc., may then be sent to a command processor 290, which may be located on a same or separate server 120 as part of the system 100. The system 100 may include more than one command processor 290, and the command processor 290 may be determined based on the NLU output. For example, if the NLU output includes a command to play music, the command processor 290 selected may be a music playing application, such as one located on the voice input device 110 or in a music playing appliance configured to execute a music playing command. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

Figure 3:
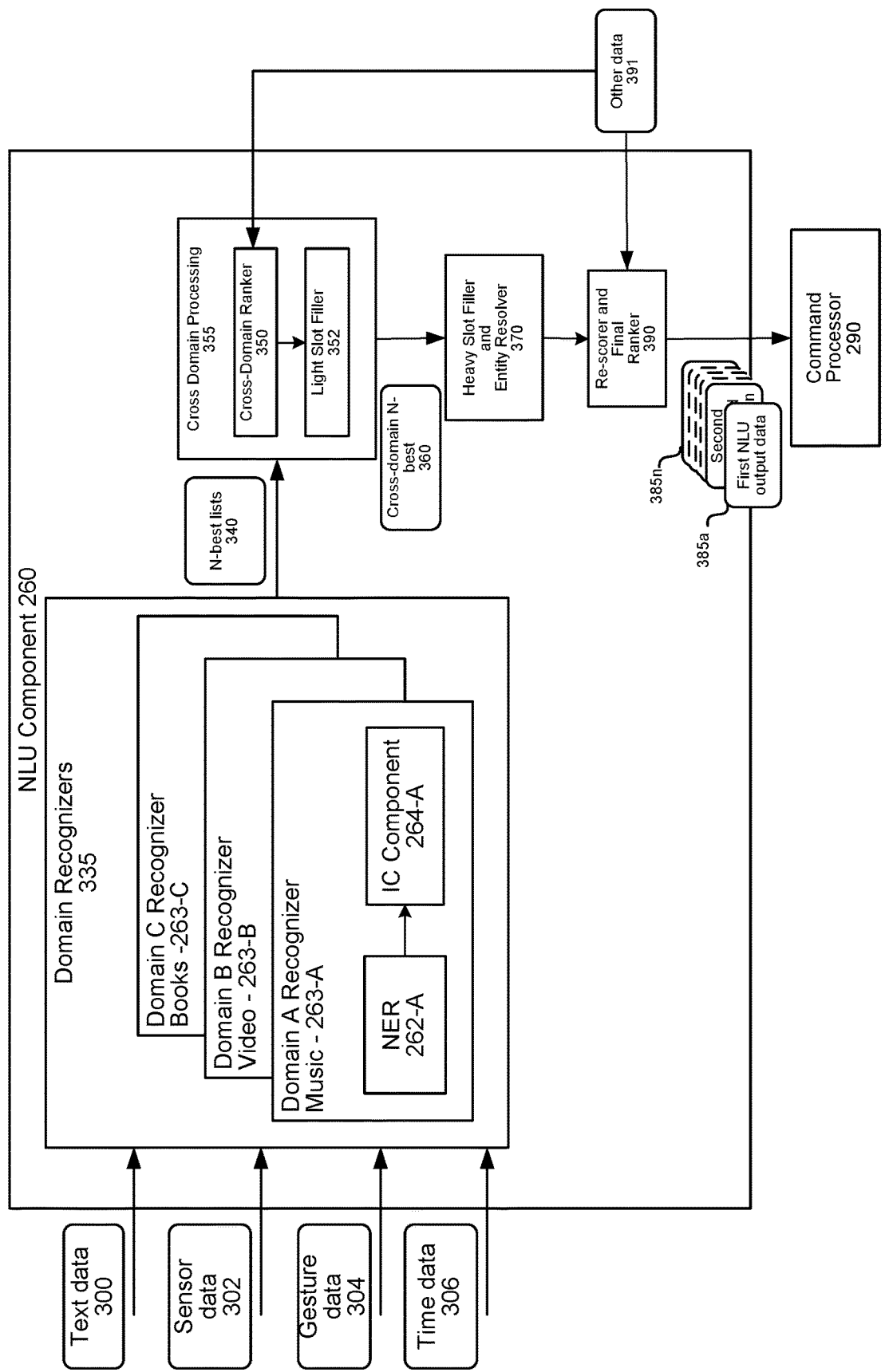
FIG. 3 is a conceptual diagram of a system architecture for parsing incoming utterances using multiple domains according to embodiments of the present disclosure.

The NLU operations of the system 100 may take the form of a multi-domain architecture, such as that illustrated in FIG. 3. In the illustrated architecture, each domain (which may include a set of intents and entity slots that define a larger concept such as music, books etc. as well as components such as trained models, etc. used to perform various NLU operations such as NER, IC, or the like) may be constructed separately and made available to the NLU component 260 during runtime operations where NLU operations are performed on text data (such as text data output from the ASR component 250). Each domain may have specially configured components to perform various steps of the NLU operations.

For example, the system 100 may include a multi-domain architecture consisting of multiple domains for intents/commands executable by the system 100 (or by other devices connected to the system 100), such as music, video, books, and information. The system 100 may include a plurality of domain recognizers 335, where each domain may include its own recognizer 263. Each recognizer may include various NLU components such as an NER component 262, IC component 264 and other components such as an entity resolver, or other components.

For example, a music domain recognizer 263-A (Domain A) may have an NER component 262-A that identifies what slots (i.e., portions of input text data 300) may correspond to particular words relevant to that domain. The words may correspond to entities such as (for the music domain) a performer, album name, song name, etc. An NER component 262 may use a machine learning model, such as a domain specific conditional random field (CRF) to both identify the portions corresponding to an entity as well as identify what type of entity corresponds to the text data portion. For example, for the text "play songs by the stones," an NER 262-A trained for a music domain may recognize the portion of text [the stones] corresponds to an entity and an artist name. The music domain recognizer 263-A may also have its own intent classification (IC) component 264-A that determines the intent of the text assuming that the text is within the proscribed domain. An IC component 264 may use a model, such as a domain specific maximum entropy classifier to identify the intent of the text, where the intent is the action the user desires the system 100 to perform.

As illustrated in FIG. 3, multiple domains may operate substantially in parallel, with different domain specific components. That is, domain B for video may have its own recognizer 263-B including NER component 262-B, and IC component 264-B. Domain C for books may also have similar components in its recognizer 263-C, and so on for the different domains available to the system 100. When input text data 300 (e.g., ASR output text data) is received, the same text data that is input into the NLU pipeline for domain A 263-A may also be input into the NLU pipeline for domain B 263-B, where the components for domain B 263-B will operate on the text data as if the text data related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC component 264 may be considered part of a recognizer (such as recognizer 263-A, 263-B, 263-C, etc.). The recognizers may operate using machine learning trained models such as a CRF, maximum entropy classifier, neural network (such as a deep neural network (DNN) or recurrent neural network (RNN)), or other classifier. The recognizers 335 may also use rules that operate on input query text data in a particular form to identify named entities and/or intents. The recognizers 335 may also operate using a data structure such as a finite state transducer (FST) to process the query text data to perform NER and/or IC. Other techniques or models may also be used to perform NER and/or IC. The techniques may also be used together. For example, a set of rules, an FST, and a trained machine learning model may all operate on input text data substantially in parallel to determine the named entities/intents of an input utterance. If one technique performs its task with high enough confidence, the system 100 may use the output of that technique over the others. The system 100 may also prioritize the results of different techniques in certain circumstances (for example rules results may be higher priority than FST results, which may be higher priority than model results, or some other configuration). Each recognizer (such as 263-A, 263-B, 263-C, etc.) may have its own rules, FSTs, and/or models operating such that each recognizer operates substantially in parallel to the other recognizers to come up with its own interpretation of the input text data.

The output of each recognizer 335 is a N-best list 340 of intents and identified slots representing the particular recognizer's top choices as to the meaning of the input text data, along with scores for each item in the N-best list 340. For example, for input text data 300 of "play poker face by lady gaga," the music domain recognizer 263-A may output an N-best list 340 in the form of:

[0.95] PlayMusicIntent ArtistName: Lady Gaga SongName: Poker Face

[0.02] PlayMusicIntent ArtistName: Lady Gaga

[0.01] PlayMusicIntent ArtistName: Lady Gaga AlbumName: Poker Face

[0.01] PlayMusicIntent SongName: Pokerface where the NER component 262-A of the recognizer 263-A has determined that for different items in the N-best list 340, the words "poker face" correspond to a slot and the words "lady gaga" correspond to a slot. (Though different items in the N-best list 340 interpret those slots differently, for example labeling "poker face" as a song name in one choice but labeling it as an album name in another.) The IC component 264-A of the recognizer 263-A has also determined that the intent of the input text data 300 is a PlayMusicIntent (and selected that as the intent for each item on the music N-best list 340). The recognizer 263-A also determined a score for each item on the list representing the recognizer's confidence that the particular item is correct. As can be seen in the example, the top item has the highest score. Each recognizer of the recognizers 335 may operate on the input text data 300 substantially in parallel, resulting in a number of different N-best lists 340, one for each domain (e.g., one N-best 340 list for music, one N-best list 340 for video, etc.). The size of any particular N-best list 340 output from a particular recognizer is configurable and may be different across domains.

While the recognizers 335 perform NER, that is they may identify words of the input text data 300 that are important for downstream processing (sometimes called light slot filling), and may even label those words according to type (such as artist name, album name, city, or the like), the recognizers 335 may not perform entity resolution (i.e., determining the actual entity corresponding to the words of the input text data 300). Entity resolution is typically a higher latency process and involves communications with a knowledge base 272 or other component to precisely identify the specific entities. As this process is resource intensive, it may be preferable to not perform this task for each item of every N-best list 340 across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 may be passed to a cross domain processing component 355 which may then further rank the individual items on the N-best lists 340 as well as perform other operations.

The cross domain processing component 355 may include a cross-domain ranker 350. The cross-domain ranker 350 takes the group of N-best lists 340 and selects from among the lists 340 the top choices to create a new N-best list 360 that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list 360 created by the cross-domain ranker 350, take the example input text data 300 of "play the hunger games." The text data 300 may be processed by each of the recognizers 335, and each will output an N-best list 340, resulting in a group of N-best lists 340 input into the cross domain processing component 355. The cross-domain ranker 350 may then rank the individual items among the N-best lists 340 to create a new N-best list 360. For example, the cross-domain ranker 350 may output an N-best list 360 in the form of:

[0.78] Video PlayVideoIntent VideoName: The Hunger Games

[0.13] Books ReadBookIntent BookName: The Hunger Games

[0.07] Music PlayMusicIntent AlbumName: Hunger Games where the top items from different N-best lists 340 from multiple domains are grouped into a single N-best list 360. As shown, the top scoring item is from the video domain 263-B, which includes the intent "playvideointent" and a slot labeled as video name corresponding to the text "the hunger games." The next item is from the books domain 263-C, and includes the intent "readbookintent" and a slot labeled as book name corresponding to the text "the hunger games." Each item in the N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. The light slot filler 352 can take information from slots and alter it to make the data more easily processed by downstream components. The operations of the light slot filler 352 are typically low latency operations that do not involve heavy operations such as reference to a knowledge base. The purpose of the light slot filler 352 is to replace words with other words or values that may be more easily understood by downstream components. For example, if input text data 300 included the word "tomorrow", the light slot filler 352 may replace the word "tomorrow" with an actual date for purposes of downstream processing. Similarly, a word "CD" may be replaced by a word "album." The replaced words are then included in the cross domain N-best list 360.

The N-best list 360 is then output to a heavy slot filler and entity resolution component 370. The heavy slot filler and entity resolver 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 370 can refer to an authority source (such as a knowledge base 272) that is used to specifically identify the precise entity referred to in the entity mention identified in the incoming text data 300. Specific intent/slot combinations may also be tied to a particular source, which may then be used to resolve the text (such as by providing information or a command to be executed in response to a user query). For example, in the example "play songs by the stones," the resolver 370 may reference to a personal music catalog, Amazon Music account, user profile, or the like. The output from the entity resolution component 370 may include an altered N-best list that is based on the cross-domain N-best list 360 but also includes more detailed information about the specific entities mentioned in the text data 300 (such as specific entity IDs) and/or more detailed slot data that can eventually be used by a command processor 290 which may be incorporated into the same system components or pipeline or may be on a separate device in communication with the system 100. While illustrated as a cross-domain resolver, multiple resolution components 370 may exist where a particular resolution component 370 may be specific for one or more domains.

As can be appreciated, the entity resolver 370 may not necessarily be successful in resolving every entity and filling every slot. This may result in incomplete results in the combined N-best list 360. A re-scorer and final ranker component 390 may consider such errors when determining how to rank the ultimate results for potential execution. For example, if an item of the N-best list 360 comes from a book domain and includes a read book intent, but the entity resolver 370 cannot find a book with a title matching the input text data 300, that particular result may be re-scored by the final ranker 390 to be given a lower score. Each item considered by the final ranker 390 may also be assigned a particular confidence, where the confidence may be determined by a recognizer 335, cross domain processor 355, or by the final ranker 390 itself. Those confidence scores may be used to determine how to rank the individual NLU results represented in the N-best lists 340. The confidence scores may be affected by unfilled slots. For example, if one domain is capable of filling a slot (i.e., resolving the word in the slot to an entity or other recognizable form) for an input query, the results from that domain may have a higher confidence than those from a different domain that is not capable of filling a slot.

The final ranker 390 may be configured to apply rescoring, biasing, or other techniques to obtain the most preferred ultimate result. To do so, the final ranker 390 may consider not only the NLU results of the N-best lists 340, but may also consider other data 391. This other data 391 may include a variety of information. For example, the other data 391 may include application rating or popularity. For example, if one application has a particularly high rating, the system 100 may increase the score of results associated with that particular application. The other data 391 may also include information about applications that have been specifically enabled by the user (as indicated in a user profile). NLU results from enabled applications may be scored higher than results from non-enabled applications. User history may also be considered, such as if the user regularly uses a particular supplemental application or does so at particular times of day. Date, time, location, weather, type of device 110, customer ID, context, and other information may also be considered. For example, the system 100 may consider when any particular applications are currently active (such as music being played, a game being played, etc.) between the system 100 and voice input device 110. The highest scoring result (or results in the case of multiple commands being in an utterance) may be passed to a downstream command processor 290 for execution.

Following final ranking, the NLU component 260 may output NLU output data 385. The NLU output data 385 may include an indicator of the command to be executed along with data associated with the command, for example an indication that the command is "play music" and the music to be played is "Adele." The NLU output data 385 may be in the form of previous NLU data such as item(s) in N-best list 340, item(s) in cross-domain N-best list 360, or the like. The NLU output data 385 may also be in a format executable by the command processor 290. Multiple instances of NLU output data (e.g., 385*a*-385*n*) may be output.

Figure 4:
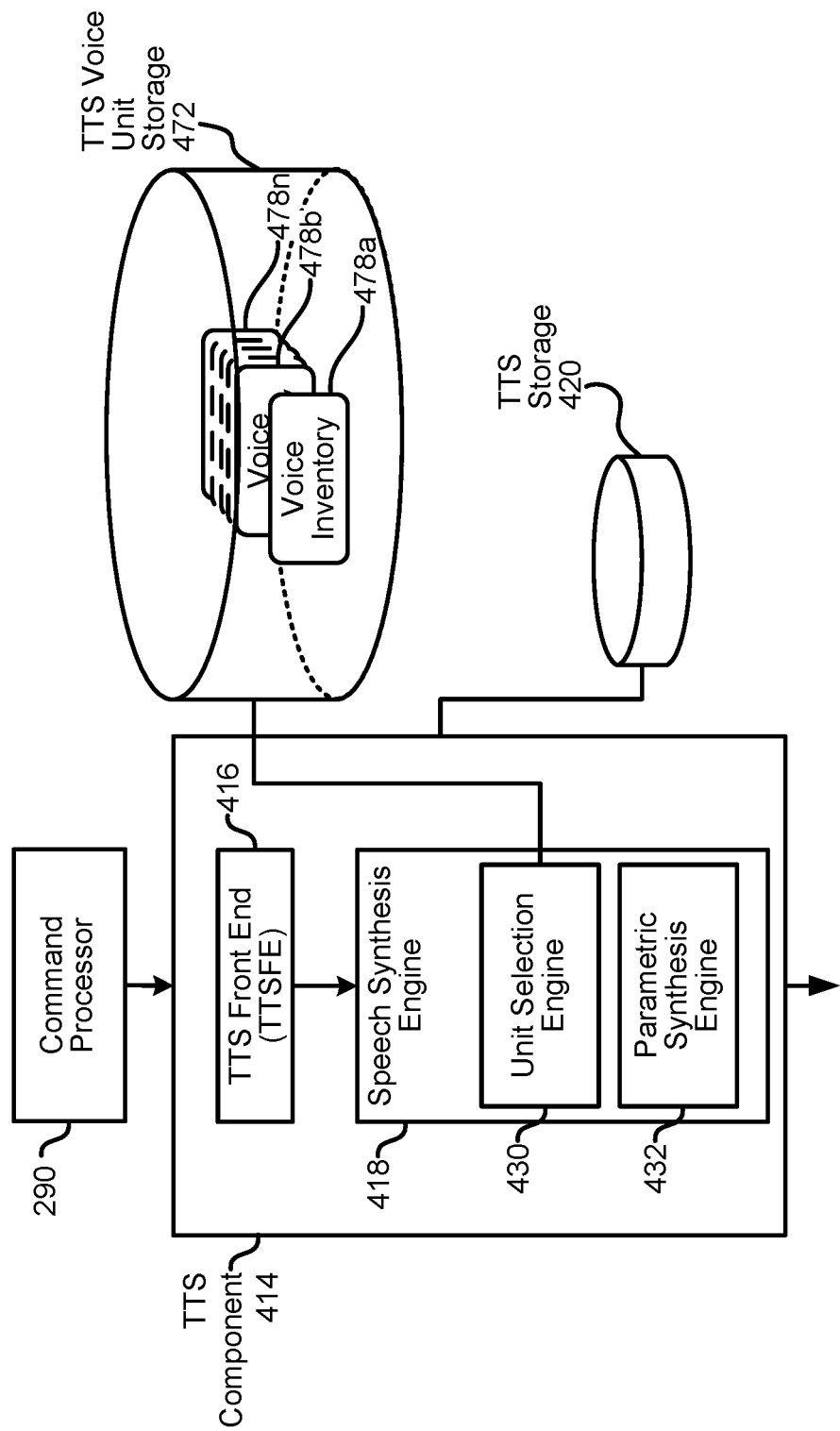
FIG. 4 is a conceptual diagram of how text-to-speech processing is performed according to embodiments of the present disclosure.

A TTS component 414 may receive tagged text data from the command processor 290, so the TTS component 414 may synthesize speech corresponding to the text data. Speech may be synthesized by the TTS component 414 as described below with respect to FIG. 4.

The TTS component 414 includes a TTS front end (TTSFE) 416, a speech synthesis engine 418, and a TTS storage 420. The TTSFE 416 transforms input text data (e.g., from the command processor 290) into a symbolic linguistic representation for processing by the speech synthesis engine 418. The TTSFE 416 may also process tags or other data input to the TTS component 414 that indicate how specific words should be pronounced. The speech synthesis engine 418 compares the annotated phonetic units and information stored in the TTS storage 420 for converting the input text data into speech (i.e., audio data). The TTSFE 416 and the speech synthesis engine 418 may include their own controller(s)/processor(s) and memory, or they may use the controller/processor and memory of the server(s) 120, the voice input device 110, or another device, for example. Similarly, the instructions for operating the TTSFE 416 and the speech synthesis engine 418 may be located within the TTS component 414, within the memory and/or storage of the server(s) 120, the voice input device 110, or within an external device.

Text data input into the TTS component 414 may be sent to the TTSFE 416 for processing. The TTSFE 416 may include components for performing text normalization, linguistic analysis, and linguistic prosody generation. During text normalization, the TTSFE 416 processes the input text data and generates standard/normalized text data, converting such things as numbers, abbreviations (e.g., Apt., St., etc.), and symbols ($, %, etc.) into the equivalent of written out words.

During linguistic analysis, the TTSFE 416 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 414 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 420. The linguistic analysis performed by the TTSFE 416 may also identify different grammatical components such as prefixes, suffixes, phrases, punctuation, syntactic boundaries, or the like. Such grammatical components may be used by the TTS component 414 to craft a natural sounding audio waveform output. The language dictionary may also include letter-to-sound rules and other tools that may be used to pronounce previously unidentified words or letter combinations that may be encountered by the TTS component 414. Generally, the more information included in the language dictionary, the higher quality the speech output.

Based on the linguistic analysis, the TTSFE 416 may then perform linguistic prosody generation where the phonetic units are annotated with desired prosodic characteristics, also called acoustic features, which indicate how the desired phonetic units are to be pronounced in the eventual output speech. During this stage, the TTSFE 416 may consider and incorporate any prosodic annotations that accompanied the text data input to the TTS component 414. Such acoustic features may include pitch, energy, duration, and the like. Application of acoustic features may be based on prosodic models available to the TTS component 414. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 416, referred to as a symbolic linguistic representation, may include a sequence of phonetic units annotated with prosodic characteristics. This symbolic linguistic representation may be sent to the speech synthesis engine 418, also known as a synthesizer, for conversion into an audio waveform of speech for output to an audio output device and eventually to a user. The speech synthesis engine 418 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 418 may perform speech synthesis using one or more different methods. In one method of synthesis called unit selection, a unit selection engine 430 matches the symbolic linguistic representation created by the TTSFE 416 against a database of recorded speech, such as a database of a voice corpus (e.g., the TTS voice unit storage 472). The unit selection engine 430 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 430 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 432, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 414 may include an acoustic model, or other models, which may convert a symbolic linguistic representation into a synthetic acoustic waveform of the input text data based on audio signal manipulation. The acoustic model includes rules which may be used by the parametric synthesis engine 432 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 416.

The parametric synthesis engine 432 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 418, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 478 (stored in the TTS voice unit storage 472), where each unit database is configured with a different "voice." Such voice inventories may also be linked to user accounts. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio data of each customized voice corpus may match a desired speech quality. The customized voice inventory 478 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 414 may synthesize speech as normal, but the system 100, either as part of the TTS component 414 or otherwise, may apply a filter to make the synthesized speech take on the desired speech quality. In this manner a traditional TTS output may be altered to take on the desired speech quality.

During runtime the TTS component 414 may receive text data for speech synthesis along with an indicator for a desired speech quality of the output speech. The TTS component 414 may then select a voice matching the speech quality, either for unit selection or parametric synthesis, and synthesize speech using the received text data and speech quality indicator.

Figure 5:
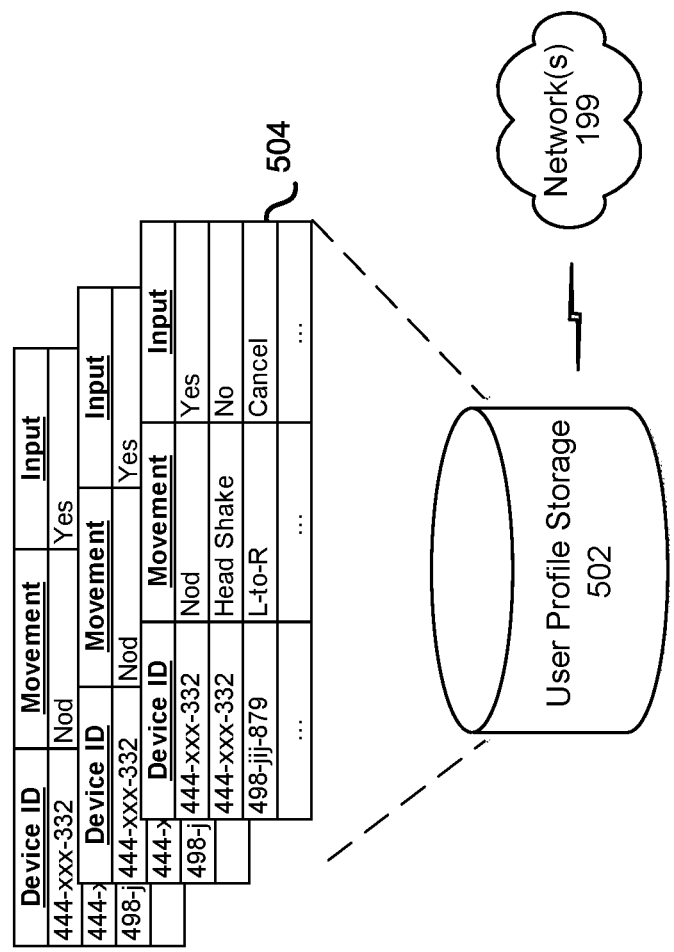
FIG. 5 illustrates data stored and associated with user profiles according to embodiments of the present disclosure.

The server 120 may also include data regarding user accounts, shown by the user profile storage 502 illustrated in in FIG. 5. The user profile storage may be located proximate to server 120, or may otherwise be in communication with various components, for example over network 199. The user profile storage 502 may include a variety of information related to individual users, accounts, etc. that interact with the system 100. For illustration, as shown in FIG. 5, the user profile storage 502 may include data regarding the devices associated with particular individual user accounts 504. In an example, the user profile storage 502 is a cloud-based storage. The user profile may store data related to physical motions or gestures of a user and how those motions/gestures are to be interpreted by the system. Such data may include device identifier (ID), movement profiles, gesture descriptors (such "yes," "no," "cancel," etc.) for different devices as well as names of users and locations of the devices.

As noted above, a wakeword is an example of a specialized keyword. For a wakeword, the associated function is typically to "wake" a local device so that it may capture audio following (or surrounding) the wakeword and send audio data to a remote server for speech processing.

A wake gesture is an example of a specialized movement input. For a wake gesture, the associated function is typically to "wake" a local device so that it may capture audio following (or surrounding) the wake gesture and send audio data and/or motion data to a remote server for processing. For motion processing enabled systems, the wake gesture may be the only movement recognized by the system and all other movements are processed using typical movement processing. In systems where other motions may be enabled, each respective motion may only be associated with a single same function that is executed regardless of the operating context of the device. For example, a "head nod" (a wake gesture) may activate motion processing components regardless of whatever else the system is doing. In another example a "head shake" may be a configured motion to shut off the system, also regardless of whatever else the system is doing. Alternatively, the same physical gesture may correspond to different commands depending on the system's operating context. For example, while playing music the system may interpret a head shake to switch songs, or the like.

FIG. 6 illustrates a speech-based system 100 comprising a wearable device 110 communicating with a server(s) 120. The communicating may include sending audio data 111, sensor data 302, gesture data 304 and/or time data 306 to the server(s) 120 via a network(s) 199. Although the figures and discussion illustrate certain operational steps of the system 100 in a particular order, the steps described may be performed in a different order (as well as certain steps removed or added) without departing from the intent of the disclosure. As shown in FIG. 6, the system 100 may include one or more voice/motion input wearable devices 110, as well as one or more network(s) 199 and server(s) 120. The server(s) 120 (which may be one or more different physical devices) may be capable of performing traditional speech processing (e.g., ASR, NLU, command processing, etc.) and/or movement processing as described herein. A single server 120 may perform all speech/movement processing or multiple servers 120 may combine to perform all speech/movement processing. Further, the server(s) 120 may execute certain commands, such as answering or responding to spoken utterances of a user of the wearable device 110 and/or answering or responding to certain movements of the user. In addition, certain speech/motion detection or command execution functions may be performed by the voice input device 110.

The wearable device 110 may include a microphone(s) 103 to detect audio uttered by a user. The microphone(s) 103 may be attached to the wearable device 110 such that utterances from a user wearing the wearing device 110 may be detected. The microphone(s) 103 may receive audio and convert the audio to audio data 111. For example, the microphone(s) 103 may receive audio in the form of audio waves spoken by the user and convert the received audio waves to audio data 111 corresponding to the audio waves. The audio data 111 may be sent to a network(s) 199 for transmission to a server(s) 120. The audio data 111 may also be processed locally on the wearable device 110, for example to detect a wakeword.

The wearable device 110 may also include one or more motion sensor(s) 630 to detect movement of the user and/or movement of the wearable device 110. The local device may include various motion sensor(s) 630 (such as those described below in reference to FIG. 19) which may produce sensor data to track various movement of the user and/or device 110. The motion sensor(s) 630 may be attached to the wearable device 110 such that any movement of the wearable device 110 may be detected, wherein such movement may correspond to movement of a body part of the user wearing the wearable device 110. The wearable device 110 may include frame elements to secure the motion sensor(s) 630 within the same structure of the wearable device 110. The motion sensor(s) 630 may detect movement and convert the movement to sensor data 302 (also referred to as sensor data 302). The sensor data 302 may be sent to a network(s) 199 for transmission to a server(s) 120. The sensor data 302 may also be sent to a gesture detection component 620 of the wearable device 110.

The gesture detection component 620 may process the sensor data 302 to determine if any movement represented by the sensor data 302 corresponds to a particular gesture recognizable by the device 110 and/or server 120. Data regarding what sensor data 302 corresponds to what gesture may be stored in association with a user profile 502, may be stored in a networked environment, may be stored by memory or storage of device 110, or may be stored in some other configuration. For example, if a wearable device 110 is be configured to determine gestures, gesture data may be stored by the device 110 and a gesture detection component 620 of the device 110 may process sensor data 302 to determine gesture data 304, as shown in FIG. 6. Further, if a server(s) 120 is be configured to determine gestures, gesture data may also be accessible to a server(s) 120 and a gesture detection component 620 of the server(s) 120 may process sensor data 302 to determine gesture data 304.

The device 110 may also be configured to determine, and send to the server(s) 120, metadata corresponding to the audio data 111 and/or the motion data (e.g., 302 and/or 304). For example, the device may determine first metadata corresponding to the audio data 111. The first metadata may include, for example, a message identifier that identifies the message in which the audio data is being sent to the server 120. The first metadata may also include, for example, a speech-session identifier that corresponds to a speech session with the system. The speech-session identifier may be used to track data exchanged between the device 110 and server(s) 120 that relates to the same speech-session. A single speech session may involve a dialog between the device 110 and server 120. For example, a device may send audio data corresponding to an utterance of "play music" and the server may respond with prompt audio data corresponding to "what music shall I play," to which the device may responds "play my favorite playlist." Each of the data exchanges in that dialog may include a speech-session identifier so the various components can track the speech-session across the dialog exchanges. While a message identifier may be unique to a particular message, the speech-session identifier may remain the same for data within a single speech-session. The first metadata may also include a device identifier that the system may use to interpret the sensor data 302 and/or gesture data 304.

The device 110 may also determine metadata, such as second metadata, corresponding to the motion data (e.g., 302 and/or 304). For example, the second metadata may include its own message identifier but may include a same speech-session identifier associated with audio data from the same speech-session. For example, if device 110 captures audio data corresponding to "play my favorite playlist" while detecting motion data corresponding to a user performing a head nod, the device 110 may send, to server(s) 120, audio data 111 corresponding to the utterance and first metadata (corresponding to the audio data 111) including a first speech-session identifier and the device may send, the server(s) 120, motion data (e.g., 302 and/or 304) corresponding to the head nod and second metadata (corresponding to the motion data) including the first speech-session identifier. The first metadata corresponding to the audio data may include an indicator that the audio data is associated with motion data, thus indicating the server(s) 120 to consider the motion data when processing the audio data. The second metadata (or other message) may include an identifier corresponding to the device type of the device 110 so that the server(s) 120 or other component may use the device type to process sensor data 302 to determine a gesture.

The metadata may be sent to the server 120 in a number of configurations. In one configuration metadata may be sent in a JavaScript Object Notification (JSON) format that includes information about the audio data/motion data. A JSON payload may be sent before the relevant data or may be sent after. Metadata may also be sent as within other data formats. For example, audio data may be encoded in one of many different formats including Moving Picture Experts Group (MPEG)-2 Audio Layer III (MP3), Advanced Audio Coding (AAC), linear pulse code modulation (LPCM), or the like. Metadata for the system may be incorporated into headers or other data structures associated with one or more such audio formats. Metadata may be sent before, after, or substantially simultaneously with the audio data and/or motion data to which it corresponds.

The metadata may also include time data 306 which may link a portion of motion data with a portion of audio data. The time data 306 may include, for example, timestamp data that associates audio data and/or motion data with a particular time so that the server 120 may link the portion of motion data with the portion of audio data for purposes of determining a command. For example, a head nod at the beginning of the utterance may have a different meaning than a head nod at the end of an utterance. The time data 306, determined by the device 110 and sent to the server 120, may be used to determine when in an utterance motion occurred. The time data 306 may include start and stop time, frame indicators (to link motion data to an audio frame), clock data, or other time data.

In an example operation, a computer-implemented method executed by a wearable device 110 may include receiving audio data from a microphone 103, the audio data corresponding to a first command. The wearable device 110 may include at least one motion sensor 630 for detecting movement of the wearable device 110. The detected movement may be movement corresponding to a wake gesture to issue a waking command to the wearable device 110. The movement may also correspond to an answer by the user or wearer of the wearable device 110, wherein the answer is in response to a prompt by the wearable device 110 (which may have originated from the server 120). For example, the wearable device may output audio in the form of a question asking the user to confirm a command. The user's answer in response to the question may be a head nod indicating a "yes" response or a head shake indicating a "no" response.

The motion sensor(s) 630 may convert the detected movement to sensor data 302 for further processing either locally on the wearable device 110 or remotely by a server(s) 120. The wearable device 110 or the server(s) 120 may determine, based at least in part on the sensor data 302, that a wake command was detected and executed by the wearable device 110. The wearable device 110 may then send the audio data 111 to a remote device for processing of the command.

Input audio data 111 may be processed to determine a first confidence that the audio data 111 includes a representation of a wakeword. The processor may determine that the first confidence is above or below a wakeword confidence threshold. If the first confidence is above the threshold the device 110 may determine that a wake command has been received. If the first confidence is below the threshold, the device 110 may determine that a wake command has not been received.

The device may also be configured to wake based on a wake gesture. Sensor data 302 may be processed by a wake command component 220 and/or a gesture detection component 620 to determine a second confidence that the sensor data 302 includes a representation of a wake gesture. The wake gesture may be one of a plurality of movements such as a head shake, a head nod, head tilt, or other movement. The head shake may be a movement of a head from side-to-side about a vertical axis. The head nod may be a movement of a head from back-to-front about a vertical axis. The head tilt may be a movement of a head about a longitudinal axis. The processor may determine that the second confidence is above or below a wake gesture confidence threshold. If the second confidence is above the threshold the device 110 may determine that a wake command has been received. If the second confidence is below the threshold, the device 110 may determine that a wake command has not been received.

The device may also be configured to wake based on a combination of receipt of a wakeword and wake gesture. For example, in a noisy environment the device may prompt the user to provide a wake command if a wakeword is not detected. For example, the device 110 may then measure a signal quality metric of the audio data. The signal quality metric may be measured in a variety of ways including measuring a signal-to-noise ratio (SNR) of the audio data, a signal-to-interference-plus-noise-ratio (SINR), decibel level, or other suitable signal quality metric. The device may then compare the signal quality metric to a threshold. In response to determining the signal quality metric is below the threshold, the wearable device 110 may output a notification that the audio quality is insufficient and/or that a physical wake gesture is requested. The notification may include at least one of an audible signal or audible notification output (such as TTS prompt) via speakers, a light emitting diode (LED) emitting light, vibration pattern (output through a haptic component of the device), or other appropriate notification. The notification may then indicate to the user that the audio quality is poor and that the user should execute a wake command (if desired). The system may then use the first confidence and the second confidence to determine if a wake command confidence threshold is satisfied. The individual confidences may be weighted and/or combined in various ways depending on system configuration and operating conditions. For example, the poorer the audio quality, the less weight the first confidence may receive. Further, a trained model, such as a trained classifier or other machine learning model may be trained to input audio data, motion data, the first confidence, the second confidence, or other data and output an indication of whether a wake command was intended based on the input data.

Figure 7A:
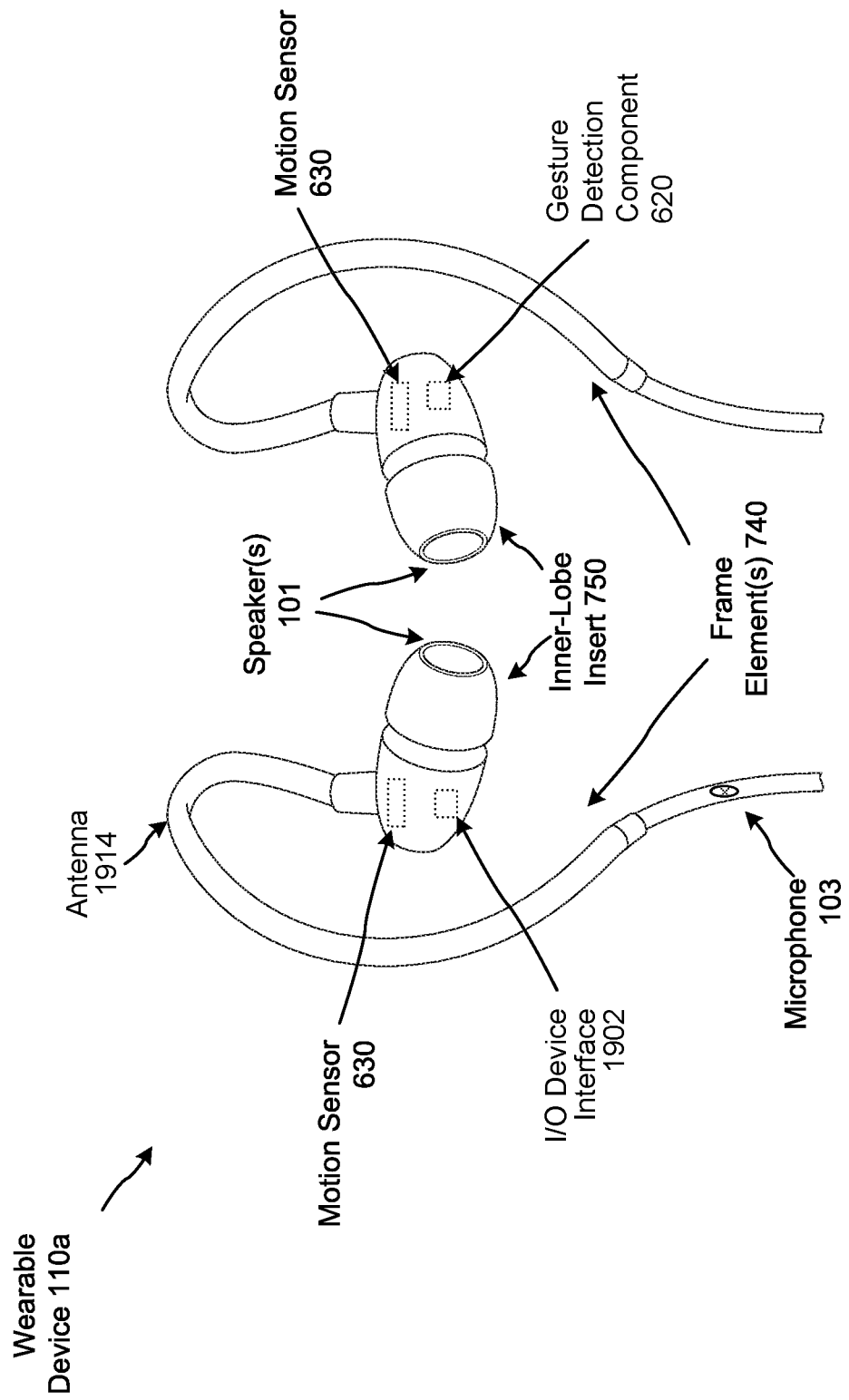

Referring to FIGS. 7A-7C, example wearable devices 110a-110c are illustrated. As shown in FIG. 7A, an example wearable device 110 may be an earbud wearable device 110a with two sides where each side includes an inner-lobe insert 750 that includes a speaker 101. Each side may also include a motion sensor 630. The motion sensors 630 may capture larger motion such as head nods, head shakes etc. The motion sensors 630 may also capture small movements and compressions within the ear canal, such as movement corresponding to a user's jaw when the user speaks. In this example, the microphone(s) 103 and the motion sensor(s) 630 may be connected to frame elements 740 of the wearable device 110. The frame elements 740 may be used to secure the wearable device to a body part (e.g., ear) of the user. The wearable device 110a may also include a gesture detection component 620 located in the construction of one of the earbud sides along with an input/output interface 1902. As another example, as shown in FIGS. 7B and 7C, a wearable device 110 may be an over-the-ear headphone 110b or glasses-type device 110c having various components for interacting with the system as discussed.

Audio data may be sent to the server(s) 120 using a wireless area network (WAN) component in communication with the network. The wearable device 110 may include a communication component with various input/output device interfaces 1902 to establish a communication connection with a wireless network. The I/O interface 1902 may include wireless communication components that work with antenna 1914 to allow wireless communication by the wearable device 110a. The communication connection may be a WiFi® connection, Bluetooth® connection, or any other type of connection known to those of skill in the art. The wearable device 110, using the I/O interface 1902, may establish a WiFi® communication connection with a wireless wide area network (WAN) via a wireless access point. For example, the wearable device 110 may access a wireless access point directly without tethering to another device capable of communicating with the wireless access point. This may allow for the wearable device 110 to access the wireless WAN independent of a companion mobile device, depending on system configuration.

Figure 8:
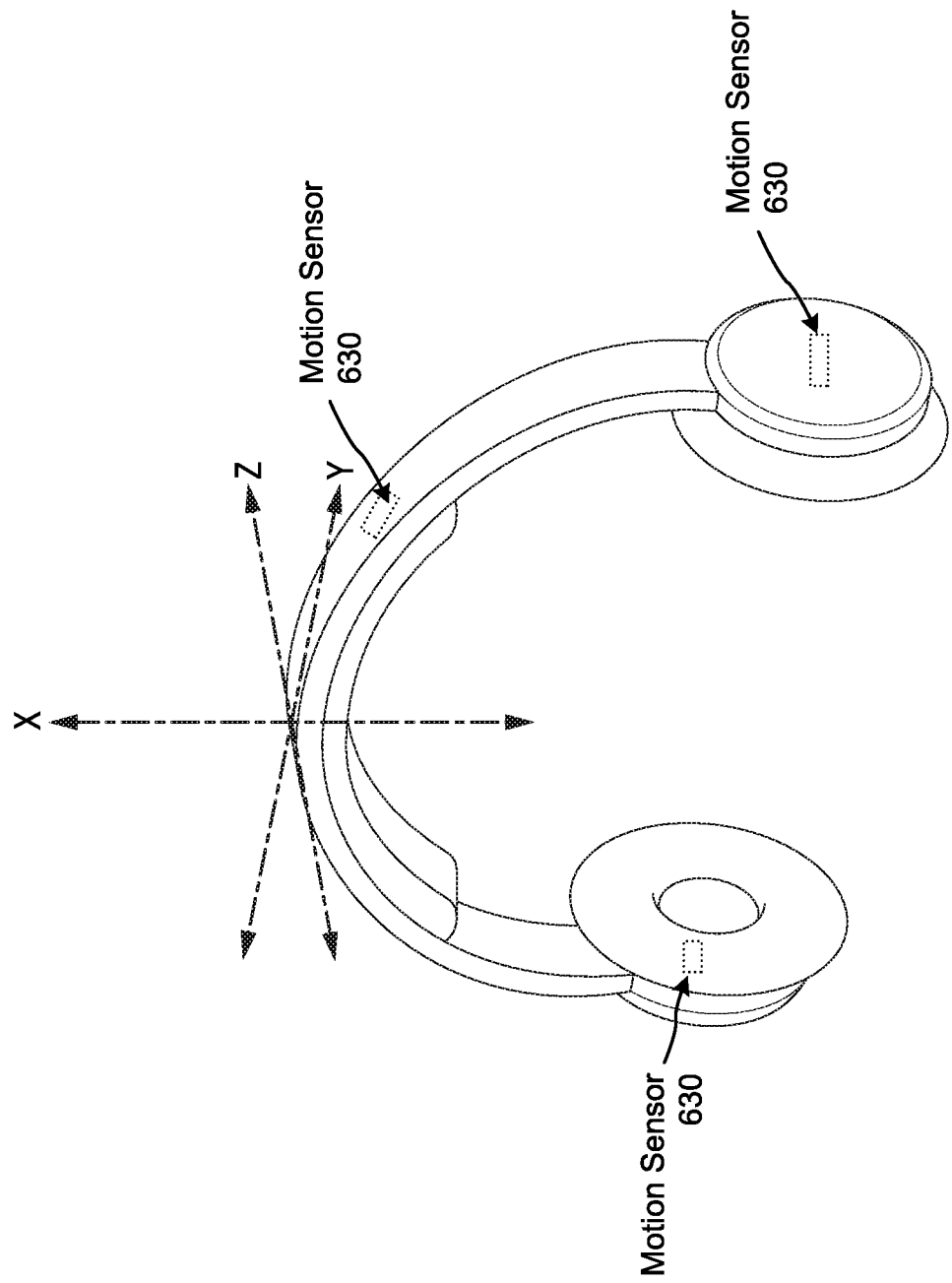
FIG. 8 illustrates example operation of a wearable device with motion sensor(s) according to embodiments of the present disclosure.
Figure 9C:
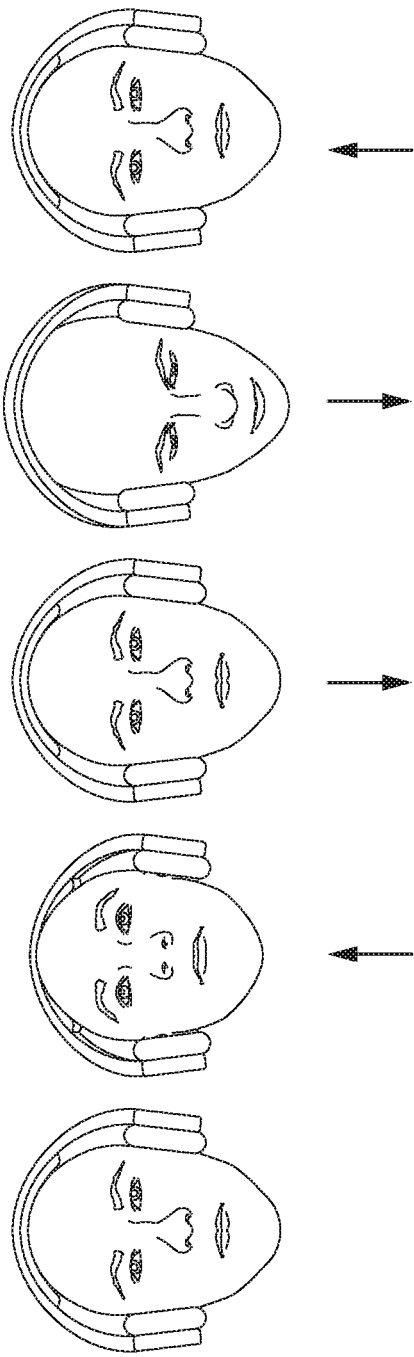
Figure 9D:
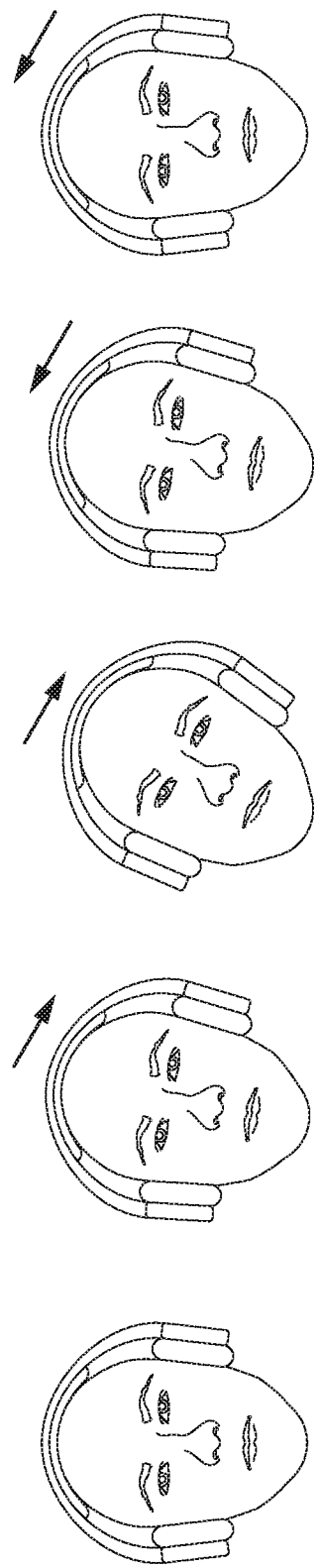

The motion sensor(s) 630 may be configured to detect various movements. As described below in reference to FIG. 19, the sensor(s) may include various components such as gyroscopes, accelerometers, proximity sensors, etc. As shown in FIG. 8, the motion sensor(s) 630 may be configured to detect and providing information about rotations and/or translations of the device, and may include electronic accelerometer(s) that may measure linear acceleration about three dimensions (such as, x-, y-, and z-axis), electronic gyroscope(s) that may measure rotational acceleration about three dimensions (e.g., roll, pitch, and yaw). In one example, as shown in FIG. 9A, the motion sensor(s) 630 may detect movement of the user's head as it rotates in one direction about vertical axis X of FIG. 8. For example, one motion sensor on one side of the device 110 may detect motion around the axis in one direction and another motion sensor on another side of the device 110 may detect motion around the axis in the same direction. In another example, as shown in FIG. 9B, the motion sensor(s) 6 may detect movement of the user's head as it rotates in one direction about vertical axis X of FIG. 8 and then back again in the other direction (for example when the user shakes his/her head). For example, one motion sensor on one side of the device 110 may detect motion around the axis in one direction and back again and another motion sensor on another side of the device 110 may detect motion around the axis in the same direction and back again. In another example, as shown in FIG. 9C, the motion sensor(s) 6 may detect movement of the user's head as it rotates in one direction about longitudinal axis Y of FIG. 8 and then back again in the other direction (for example when the user nods). For example, one motion sensor on one side of the device 110 may detect motion around the axis in one direction and another motion sensor on another side of the device 110 may detect motion around the axis in the same direction. In another example, as shown in FIG. 9D, the motion sensor(s) 6 may detect movement of the user's head as it rotates in one direction about longitudinal axis Z of FIG. 8 and then back again in the other direction (for example when the user inclines his/her toward a shoulder). For example, one motion sensor on one side of the device 110 may detect a certain motion in one direction and another motion sensor on another side of the device 110 may detect a slightly different motion (as it may be travelling a different distance) in the same direction. Thus, in a device 110 with multiple motion sensors 630, sensor data 302 from multiple motion sensors 630 may be used to determine a gesture as described herein. Many other movements are also possible.

The gesture detection component 620 may match particular movement sensor data 302 to particular gestures. For example, the gesture detection component 620 may input sensor data 302 corresponding to the movement of example 9A and may output gesture data 304 indicating [head left turn]. In another example, the gesture detection component 620 may input sensor data 302 corresponding to the movement of example 9B and may output gesture data 304 indicating [head shake]. In another example, the gesture detection component 620 may input sensor data 302 corresponding to the movement of example 9C and may output gesture data 304 indicating [head nod]. In another example, the gesture detection component 620 may input sensor data 302 corresponding to the movement of example 9D and may output gesture data 304 indicating [head side nod left].

While the gesture data 304 may correspond to particular movements, the gesture data 304 may also correspond to certain commands. For example, if the system 100 is executing a music playing command using server(s) 120 and/or device 110 to output music data to the user, a particular gesture (for example the side head nod of FIG. 9D) may be interpreted as a command to skip a song. In this example, the sensor data 302 may indicate the movement of FIG. 9D and may be sent to a gesture detection component 620, either located on device 110 or remotely with a server(s) 120. The gesture detection component 620 may then receive the sensor data 302 and determine that a music application is currently running. Thus the gesture detection component 620 may output gesture data 304 indicating [skip song]. The gesture data 304 of [skip song] may then be sent to an NLU component 260, music command processor 290, or other component to indicate that the user has executed a command of [skip song]. Further, in the example of where the gesture is a wake command, the sensor data 302 generated by the motion sensor(s) 630 may be interpreted by the gesture detection component 620 and/or the wake command component 220 as a wake gesture, and thus the output gesture data 304 may include [wake] or other data indicating detection of a wake gesture.

Further, as can be appreciated, a command indication output by a gesture detection component 620 may depend on the operation status of the device. For example, if music is being sent from a command processor 290 to the device 110, sensor data 302 corresponding to the movement of FIG. 9D may be interpreted by the gesture detection component 620 as [skip song]. However, if a command processor 290 is coordinating with the device 110 to provide direction information, the same movement of FIG. 9D may be interpreted differently by the gesture detection component 620, for example it may be interpreted as a command to [repeat step]. Thus a gesture detection component 620 may be configured to an indicator of a gesture (e.g., [nod], [head shake], etc.) and/or an indicator of a command (e.g., [skip song], [initiate phone call], [repeat step], etc.) depending on the operational status of the device. The indicator of a gesture or indicator of a command may be interpreted by a component such as an NLU component 260, command processor 290, or other component to control system operation. In addition, if a dialog with the system is ongoing such that the system may send prompt data to the device 110 soliciting further information from the user, the indicator generated by the gesture detection component 620 may correspond to the prompt. For example, if the system requests that the user respond "yes" or "no" and the user nods, the gesture detection component 620 may detect the sensor data 302 of the nod, and generate gesture data 304 indicating [yes] (or [no] for a head shake). Thus the gesture data 304 may be a direct response to a system prompt. The prompt data may be associated with a speech-session ID to link various exchanges between the device 110 and server 120 as part of the same speech-session.

Further, if a gesture detection component 620 is operated by a server(s) 120, or by another component that is not the device 110, the gesture detection component 620 may be configured to operate differently on sensor data 302 depending on what device 110 captured the sensor data 302. For example, one set of sensor data 302 from an ear bud device 110a may be interpreted differently from another set of sensor data 302 from an over-the-ear device 110b. Thus, the gesture detection component 620 may determine gesture data 304 based on what type of device, sensor, etc. produced the sensor data 302. An indicator of the device 110 corresponding to the sensor data 302 may be stored in a user profile 502 indicating what device is used with a particular speech session. An indicator of the device 110 may also be included in the motion data 302/304 that is sent to the server(s) 120 from a device 110. The indicator of the device 110 may also be stored in other configurations.

The motion sensors may also be configured to detect more minute movements that correspond, for example to a user's jaw vibrations when the user speaks. Such jaw vibrations (or other smaller movements) may be captured and converted into raw sensor data 302 to be used by the device 110 and/or sent to server 120. The small movement sensor data may also be converted by a gesture detection component 620 into particular gesture data 304, which may be sent to server 120. The system 100 may use the motion data (either sensor data 302 and/or gesture data 304) to confirm the contents of an utterance. For example, a user's utterance such as "Play the Beatles on Spotify" may produce a unique signature corresponding to the utterance of those words received as audio input and as movement input to the wearable device via the microphone 103 and motion sensor(s) 630 respectively. As another example, a user's utterance such as "Order Tide from Amazon" would produce another unique signature corresponding to the utterance of those series of words received as audio input and as movement input to the wearable device via the microphone 103 and motion sensor(s) 630 respectively. When processing audio data 111 to determine text data 300, the server(s) 120 may analyze motion data 302/304 to select between certain text hypotheses to determine if ASR results are correct. Thus, the motion data may be used to augment the ASR analysis process, improve word error rates (WER), improve NLU, or otherwise improve system operation.

FIG. 10 illustrates an exemplary method (1000) for communicating with a speech-controlled system using a wearable device is described. The method may include receiving (1002) first audio data from a microphone connected to the wearable device. A signal quality metric, such as signal-to-noise ratio (SNR) of the first audio data may be determined (1004) for comparison to a threshold. If the signal quality metric is determined to be at or above a threshold, the first audio data may be sent (1006) to a remote device or further component of the wearable device for processing. If the SNR is determined to be below a threshold, a low signal quality notification may be provided (1008) to the user of the wearable device. In response to receiving or detecting the notification, the user may perform a movement corresponding to a wake gesture. The method may then include receiving (1010) input motion data from a motion sensor in the wearable device. The input motion data may be generated by the motion sensor in response to the motion sensor detecting the wake gesture movement performed by the user. The wake gesture may be an intentional movement of the user corresponding to a wake command as described herein. Next, the method may include determining (1012) that the movement corresponds to a wake gesture and thus may determine (1014) that a wake command was executed. This may include comparing sensor data 302 with stored data corresponding to a wake gesture(s). Second audio data may be received (1016) from the microphone. The second audio data may then be sent (1018) to a remote device for processing or may process the audio data by the local device 110.

When processing sensor data 302 to determine if the device motion matches a stored gesture, the wake command detection component 220 and/or gesture detection component 620 may compare motion data to stored models or data corresponding to movement signatures to detect a gesture, such as a gesture corresponding to a particular command, a wake gesture, or the like.

In response to detecting that sensor data 302 corresponds to a wake gesture, the wake command component 220 may initiate a wake sequence, capture audio, send audio data to a server(s) 120, or perform other processing. In response to detecting that sensor data 302 corresponds to another gesture, the gesture detection component 620 may be configured to generate gesture data 304. Gesture data 304 may be generated by the gesture detection component 620 based at least on sensor data 302 received from the motion sensor(s) 630. The gesture detection component 620 may thus receive sensor data 302 from a motion sensor(s) 630 and perform processing on the sensor data 302 to generate the gesture data 304. The gesture data 304 may include an indicator of the gesture performed (e.g., head nod, head shake, etc.), an indicator of the command associated with the gesture (e.g., cancel, skip audio track, etc.), or other data. The indicator or other data may be text data. The gesture data 304 may be in a format that can be input to a natural language understanding (NLU) component so that that the gesture data 304 may be used to determine an intent of the user, for example an intent corresponding to an utterance (uttered either contemporaneously or at a different time from the gesture), or the gesture data 304 may be used as an independent input to an NLU component 260. For example as briefly discussed above, the gesture data 304 may be determined to correspond to a "yes" response input to the system. An indicator of the "yes" response may be processed by the NLU component 260. Alternatively, the gesture detection component 304 may reside on a server(s) 120 in which case sensor data 302 may be sent to the server(s) 120 or conversion into gesture information for processing by the NLU component 260 or other component. In certain circumstances, converting the sensor data 302 to gesture data 304 decreases the size of data being sent to the NLU processor for processing and allows the NLU processor to process the gesture data 304 more efficiently than it would process the sensor data 302.

Gesture data 304 and/or sensor data 302 may also be sent to an ASR component 250 to assist with recognition of words in audio data. For example, ear buds comprising pressure sensor(s) to detect pressure change within ear canal to determine a signature corresponding to the mouthing of words may increase the accuracy of ASR processing, particularly in noisy environments. Thus, an ASR component 250 may use motion data to select between different ASR hypotheses where one hypothesis may more closely correspond to the motion data than another.

A device 110 and/or server 120 may store data corresponding to a plurality or movement signatures/gestures. The wearable device may access the database to compare motion data/gesture data received from the motion sensors with data stored in the database. The plurality of movement signatures may include a head nod, a head shake, a head rotation, jaw movement, or any combination thereof, detected about a user's face. Jaw movement may also be detected, in the case of an ear bud wearable device that is inserted into the ear canal of a user. The plurality of movement signatures may include numerous variations of the movements described herein. For example, a movement signature may include a series of head nods, a series of head shakes, a series of head rotations, or any combination thereof. Numerous variations of the movements may also include partial or extended movements of the movements described herein. For example, a head nod wherein the head only moves in one direction and not the other direction to complete a full head nod, may correspond to one of the plurality of movement signatures. Even further, a head movement that is held in one position for a period of time may be considered an extended movement that is one of the plurality of movement signatures. Additional movement signatures may be provided to the database for storage to update the plurality of movement signatures. The user may also modify the database to provide customized movement signatures for comparison to future motion data detected by the motion sensor.

The wake command component 220 and/or gesture detection component 620 may determine a confidence or score that sensor data 302 corresponds to a particular gesture. The confidence may confidence may correspond to a likelihood that the input motion received at the device is or is similar to a gesture. For illustration purposes, assume the wake gesture is a head nod. In this case, the device would compare the input motion of a nod from the user and determine a confidence that the input nod gesture is the gesture. In some embodiments, an input nod from the device may determine that the input nod gesture from the user is not the gesture because, for example, the input nod may be part of a series of nods indicating that the user is reacting to music. As another example, the device may determine that the input nod is not a gesture because the user is moving his or her head in a manner that is not intended to perform the gesture. In this manner, the device processes the input motion data to determine a confidence that the input motion data is similar to stored data corresponding to a gesture. The gesture may be a user defined input which is then stored in the database and made available for future use for comparison to motion data generated from detected movements of the user. The confidence data may be sent to the server(s) 120 as part of gesture data 304 or in some other form.

The device may operate in a motion detection mode where the wearable device only responds to a wakeword when the wakeword is detected in conjunction with a particular movement detected by motion sensors in the wearable device. The detected movement may correspond to a movement signature corresponding to one of a plurality of movement signatures stored in a database. The detected movement may match a movement signature indicating that the user of the wearable intends to wake up the system from a sleep mode. Metadata (for example time data 306) may be embedded in the audio data file with a flag that is a "yes" or a "no" that may be time synchronized with the audio frames to associate sounds with the motion data. Another movement may correspond to a command to cancel the wakeword detection process by invoking another wake motion or wake gesture.

According to another example embodiment, the method for communicating with a server using motion data may include determining first motion data of a first motion sensor and second motion data of a second motion sensor occur in a first plane and determining a score based on the movement in the first plane is above a threshold. If the motion patterns are the same as opposed to being offset, determine that the motion data is authentic and not accidental.

Figure 11:
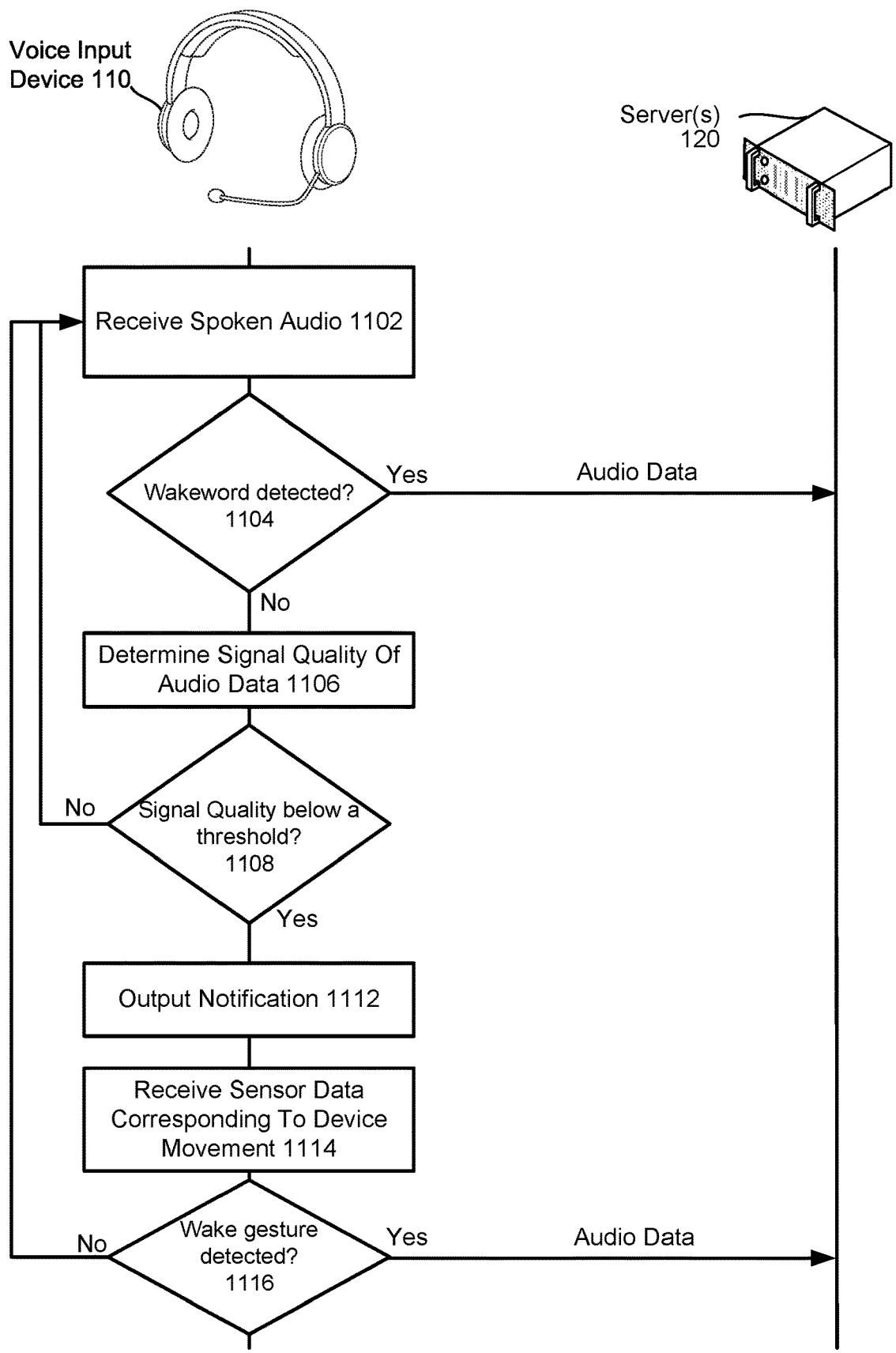
FIG. 11 illustrates using motion data to confirm a wake command according to embodiments of the present disclosure.

Referring to FIG. 11, illustrated is a flow diagram illustrating an exemplary method for confirming a wake command of the device using a wake gesture. This method may be desirable when a device encounters audio data of low signal quality (for example due to a noisy environment, etc.). The wearable device receives (1102) spoken audio, for example via a microphone of the wearable device. The device 110 may check (1104) if a wakeword is detected. If a wakeword is detected (1104:Yes), meaning the wake command module 220 or other component has detected a wakeword with a sufficiently high confidence (e.g., a confidence above a threshold), audio data corresponding to the audio may be sent to server(s) 120 for processing. If a wakeword is not detected (1104:No) the device 110 may determine (1106) a signal quality metric corresponding to audio data of the spoken audio. In an alternate embodiment the device 110 may send the audio data to the server 120 and the server may determine (1106) the signal quality metric. If the signal quality metric is not determined to be below a threshold (1108:No), the system may determine that the audio was of sufficient quality and a wakeword was not detected. Thus the system may continue to receive new audio and attempting to detect a wakeword. If the signal quality metric is determined to be below a threshold (1108:

Yes) the device may output (1110) a notification, indicating that the audio quality is poor and that a wake gesture may be required to execute a wake command. Alternatively or in addition, the server 120 may send prompt data to the device 110 prompting the user to confirm whether a wakeword was intended (for example "did you intend to speak a command? Please nod if yes." or the like). The wearable device may then receive (1114) sensor data from one or more motion sensors of the wearable device. The wearable device may compare the sensor data to motion signature(s) corresponding to wake gestures to determine (1116) if a wake gesture is detected. If a wake gesture is not detected (1116:No) the system may continue to receive new audio and attempting to detect a wakeword. If a wake gesture is detected (1116:Yes), meaning the wake command module 220 or other component has detected a wake gesture with a sufficiently high confidence (e.g., a confidence above a threshold), the device 110 may capture audio and send audio data to the server(s) 120. The audio may include the original audio received in 1102 or may correspond to new audio data corresponding to audio received during or after the wake gesture.

Figure 12:
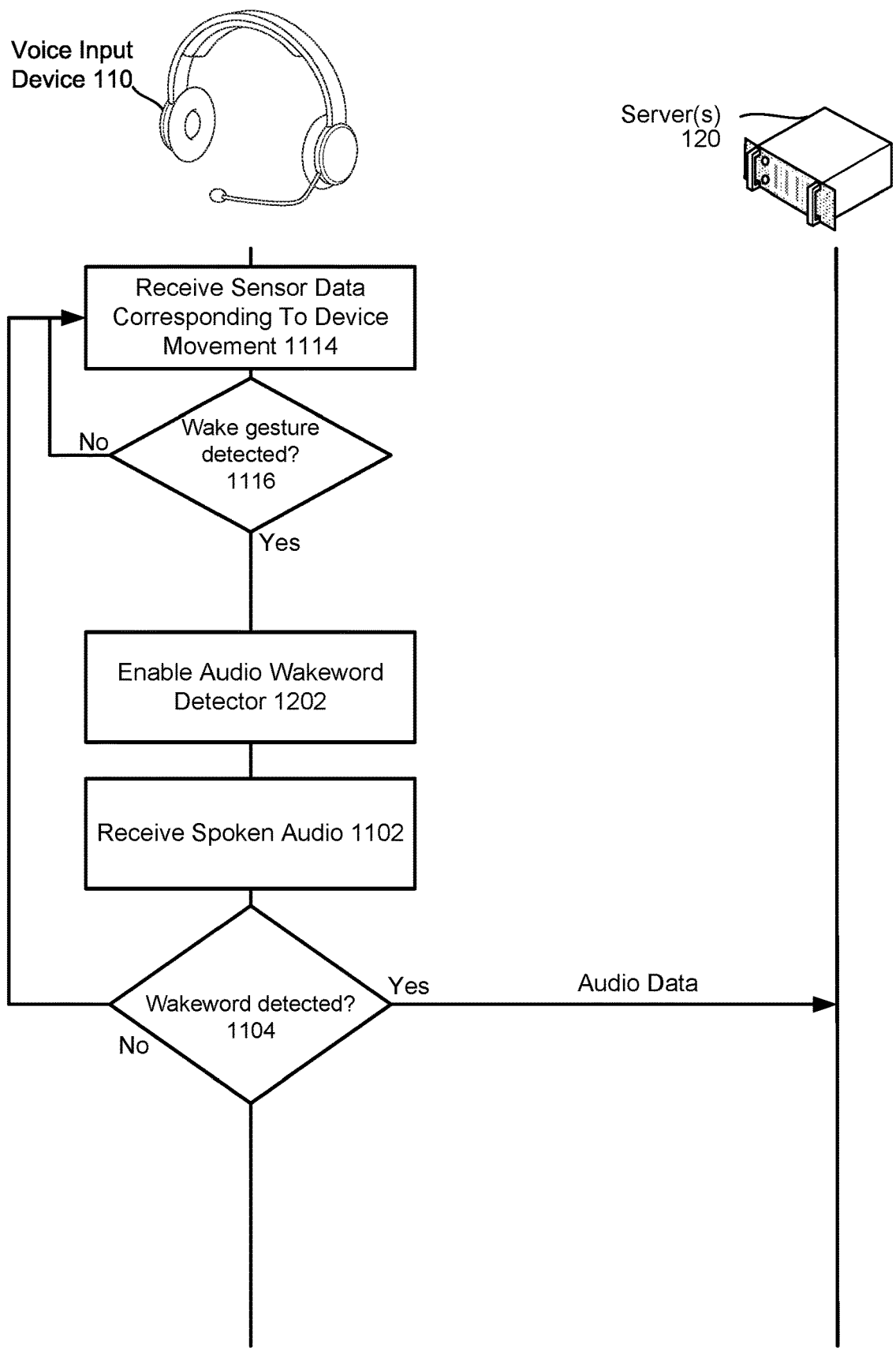
FIG. 12 illustrates using motion data to detect a wake command to enable wakeword detection according to embodiments of the present disclosure.

In another configuration, a wake gesture may be used to turn on an audio wakeword detector. In such a configuration, a device 110 may conserve battery power that may otherwise be used to continuously compare input audio data with a wakeword to determine if a wakeword is spoken. Instead, the device may continually analyze sensor data 302 to determine if a wake gesture is detected. Once the wake gesture is detected, the device may enable the wakeword detector to detect a wakeword, and then once the wakeword is detected the device may send audio data to a server(s) 120 for further processing. As shown in FIG. 12 a device may receive 1114 sensor data 302 corresponding to device movement. The device may then process that sensor data 302 to determine if (1116) a wake gesture is detected. If a wake gesture is not detected (1116:No), the device may continue processing incoming sensor data 302. If a wake gesture is detected (1116:Yes), the device may enable (1202) (e.g., power on) an audio wakeword detection component. The device may then receive (1102) spoken audio, convert that audio into audio data and process the audio data using the audio wakeword detection component (which may be part of wake command component 220) to determine if (1104) a wakeword is detected. If a wakeword is detected (1104:Yes) the device can send audio data to the server(s) 120 for further processing.

Figure 13:
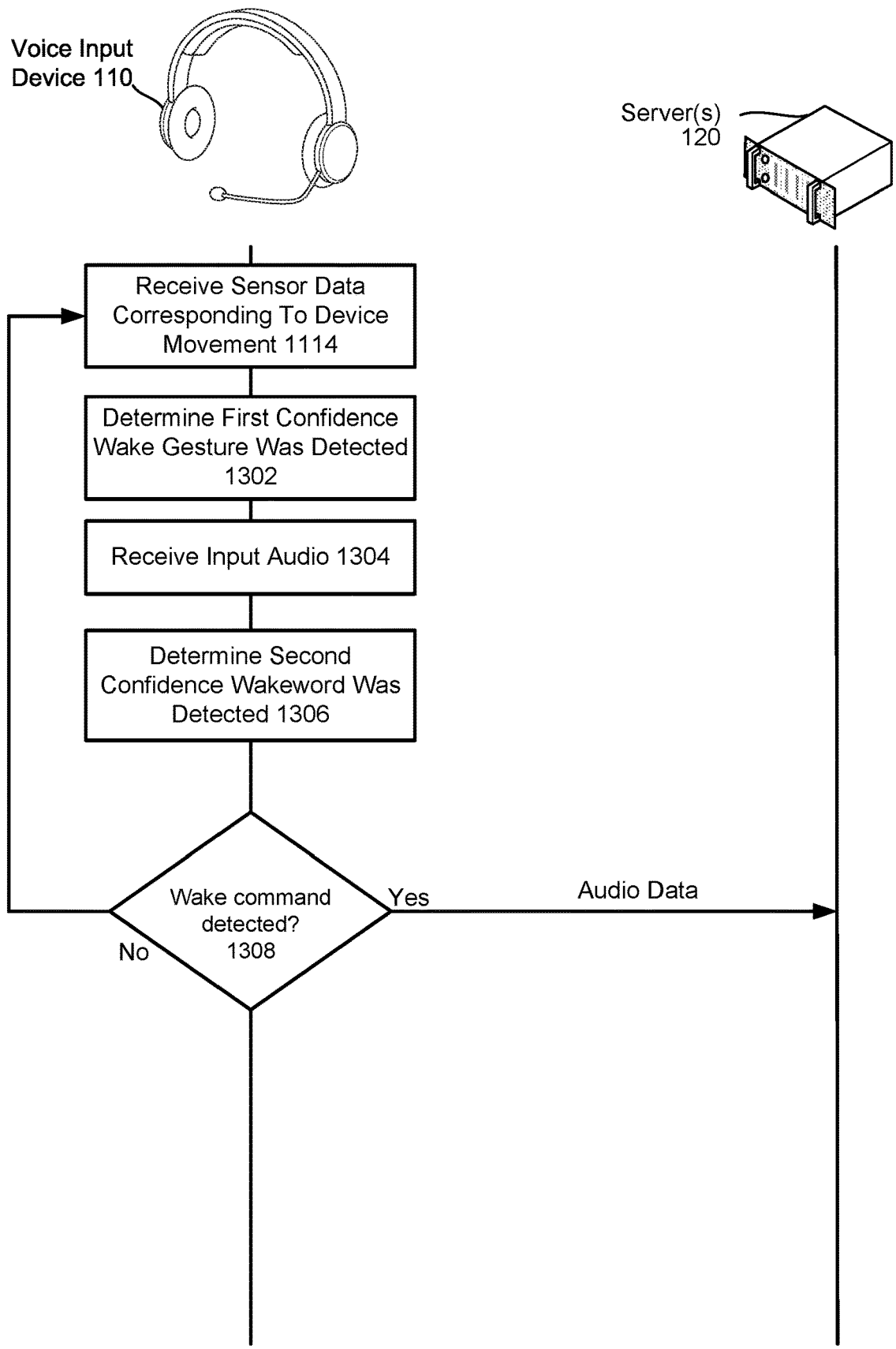
FIG. 13 illustrates using a combination of a wake gesture and a wakeword according to embodiments of the present disclosure.

In another configuration, a device may attempt to detect a wakeword and/or wake gesture and use a combined confidence to determine if a wake command was detected. As shown in FIG. 13, the device may receive sensor data 302 corresponding to device movement. The device 110 may then process the sensor data 302 using a wake command detection component 220, gesture detection component 620, or the like, to determine (1302) a first confidence that a wake gesture was detected. The device 110 may also receive (1304) input audio and determine input audio data corresponding to the input audio. The device 110 may then process the input audio data using a wake command detection component 220 or the like to determine (1306) a second confidence that a wakeword is represented in the input audio data. Using both the first confidence and the second confidence the device 110 may then determine (1308) if a wake command was detected, and if so, send audio data to the server(s) 120. To determine if a wake command was detected the device 110 may weight the first confidence by a first weight and the second confidence by a second weight where the weights are determined based on operating conditions. For example, the second weight may be higher in low noise conditions but lower in high noise conditions. Other examples of weighting are also possible.

Figure 14A:
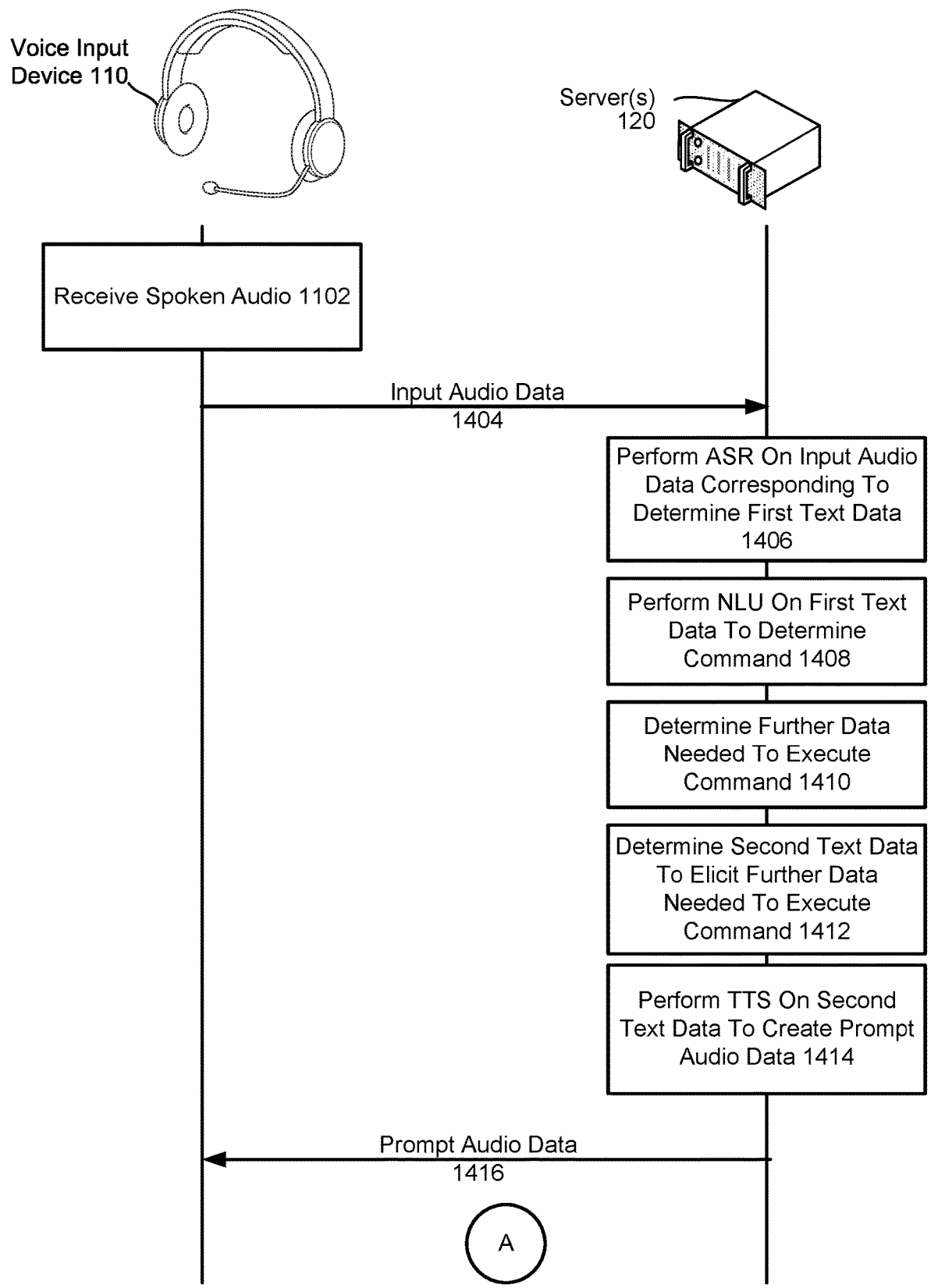

FIGS. 14A through 14B illustrate escalation of voice-based interactions and motion-based interactions via voice input devices. As shown in FIG. 14A, a first voice input device 110a receives (1102) spoken audio. For example, the voice input device 110 may be in a sleep mode until detection of a spoken wakeword, which triggers the voice input device 110 to wake and capture audio including the spoken wakeword and speech thereafter. The voice input device 110a sends (1404) input audio data corresponding to the captured spoken audio to the server 120. The audio data corresponding to the captured spoken audio sent to the server 120 may correspond to as a command or request for the server 120(s) to perform an action.

The server 120 may perform (1406) ASR processing on the input audio data to determine first text data. The server 120 may then perform (1408) NLU processing on the first text data to determine a command associated with the spoken audio. The server 120 may then determine (1410) that further data is needed to execute the command. For example, the command may not be executable until the server 120 obtains further information from the user, such as a choice of some sort. The server 120 may then determine (1412) second text data to elicit further data needed to execute the command. The server 120 may then perform (1414) TTS on the second text data to generate prompt audio data corresponding to a spoken prompt the user. The server 120 may then send the prompt audio data (1416) to the device 110 for output.

Turning to FIG. 14B, the device 110 may receive (1114) sensor data corresponding to device movement. The device 110 may then determine (1116) that the sensor data corresponds to a gesture. The device 110 may then send (1418) the server 120 motion data which may include sensor data 302, and/or gesture data 304 (which may include confidence data as well). The server 120 may then process (1420) the motion data to determine further data to execute the command. The server may then execute (1422) the command using the further data. Execution of the command may result in the server 120 or other component (such as application server 125) generating 1424 output audio data. The output audio data may be sent (1426) to the device 110. The device 110 may then receive (1428) and output the output audio data from the server 120 (1128). The input audio data, prompt audio data, motion data and/or output audio data may all be associated with a same speech-session ID to link various exchanges between the device 110 and server 120 as part of the same speech-session.

Figure 15:
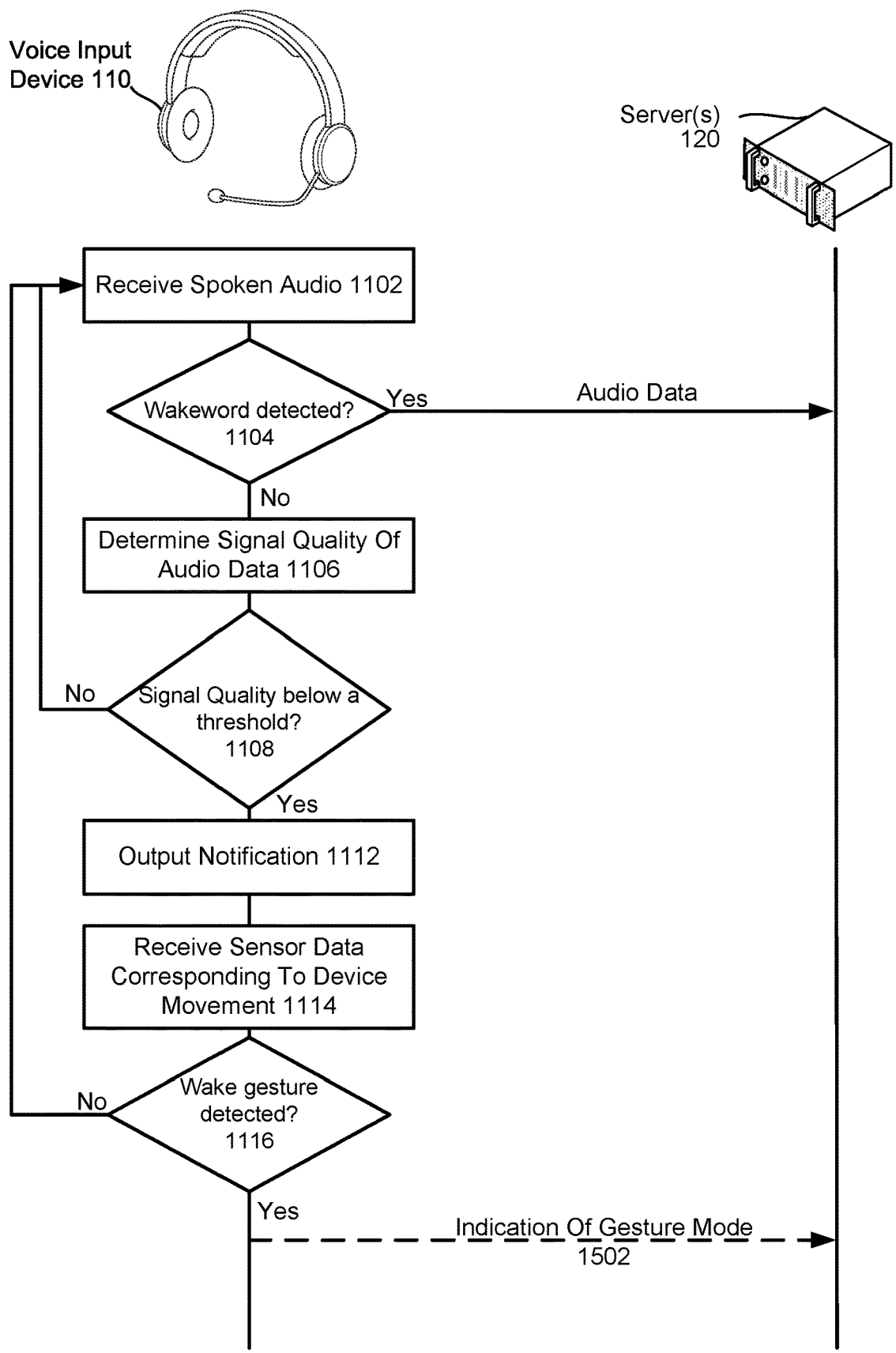
FIG. 15 illustrates using motion data to enter into a gesture mode with a speech processing system according to embodiments of the present disclosure.

The system may also be configured to operate in a gesture mode where motion data (such as sensor data 302/gesture data 304) can be processed by the system (such as by NLU component 260) in addition to, or in lieu of, speech-related audio data to execute commands, even in a non-prompt situation. In one example, a device 110 may enter a gesture mode in response to an audio signal quality being below a threshold. For example, FIG. 15 illustrates an interaction between the device 110 and server 120 that is similar to that illustrated in FIG. 11. However, as shown in FIG. 15, once the wake gesture is detected (1116:Yes), the device 110 may optionally send (1502) an indication of gesture mode to the server 120. This indication is optional, but may indicate to the server that future communications with the local device 110 may be governed by gestures due to low audio quality.

Figure 16:
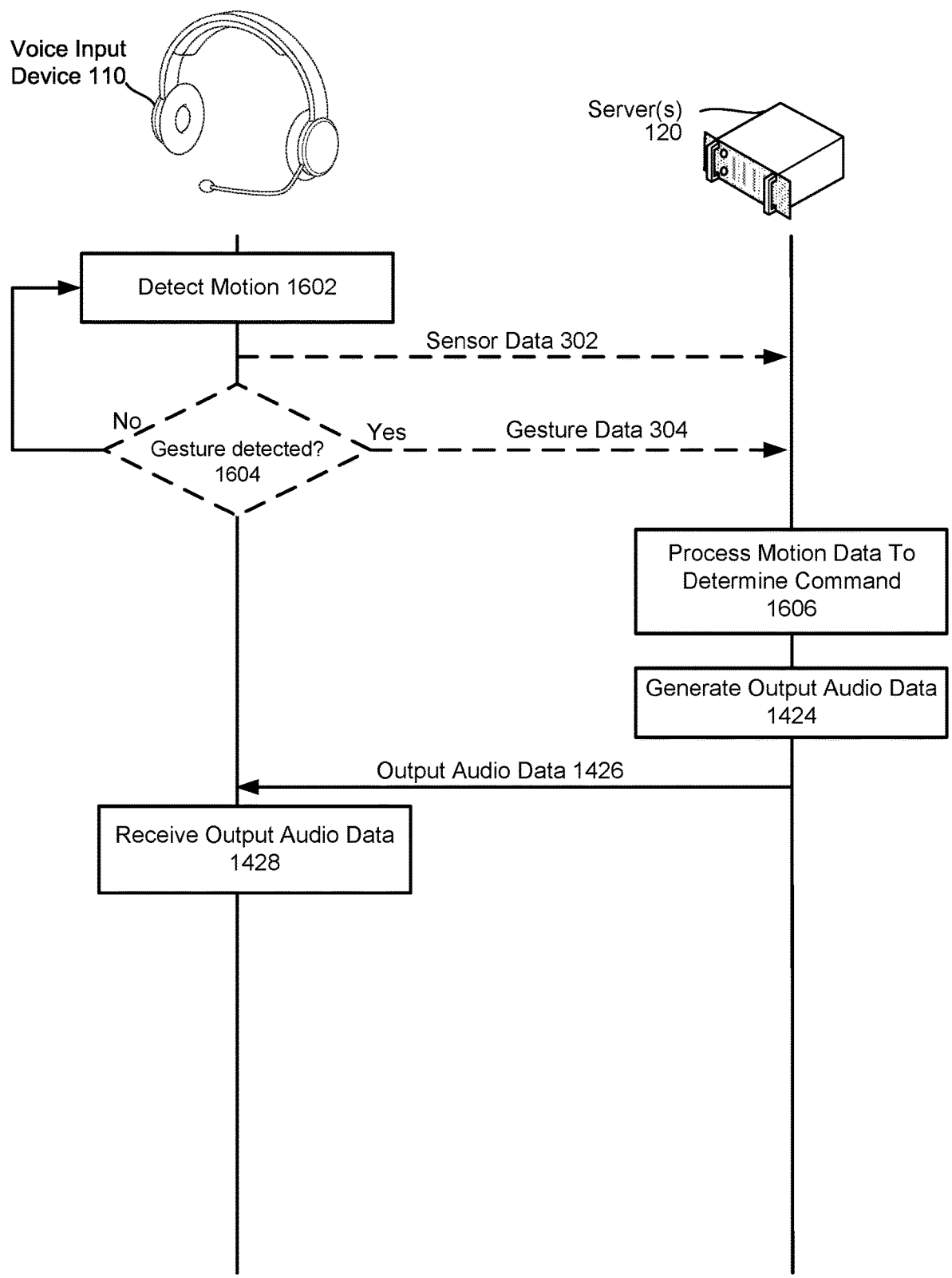
FIG. 16 illustrates using motion data to execute a command according to embodiments of the present disclosure.

Either after a gesture mode has been indicated, or as part of other operation, the device 110 may send motion data to the server 120 to be used to execute a command. As shown in FIG. 16, once the gesture the wake gesture is detected the device may detect (1602) further motion. The device 110 may then send sensor data 302 corresponding to that motion to the server 120. The device 110 may also process the sensor data 302 to determine (1604) if a gesture is detected (e.g., the sensor data 302 matches a movement profile). If a gesture is not detected (1604:No) the device may continue to detect movement. If a gesture is detected (1604:Yes) the device may send gesture data 304 to the server 120. The server 120 may process (1606) the motion data (either the sensor data 302 and/or the gesture data 304) to determine a command associated with the motion. The server 120 may then generate (1424) output audio data corresponding to the command and send (1426) the output audio data to the device 110, which then receives (1428) the output audio data and outputs corresponding audio.

Figure 17:
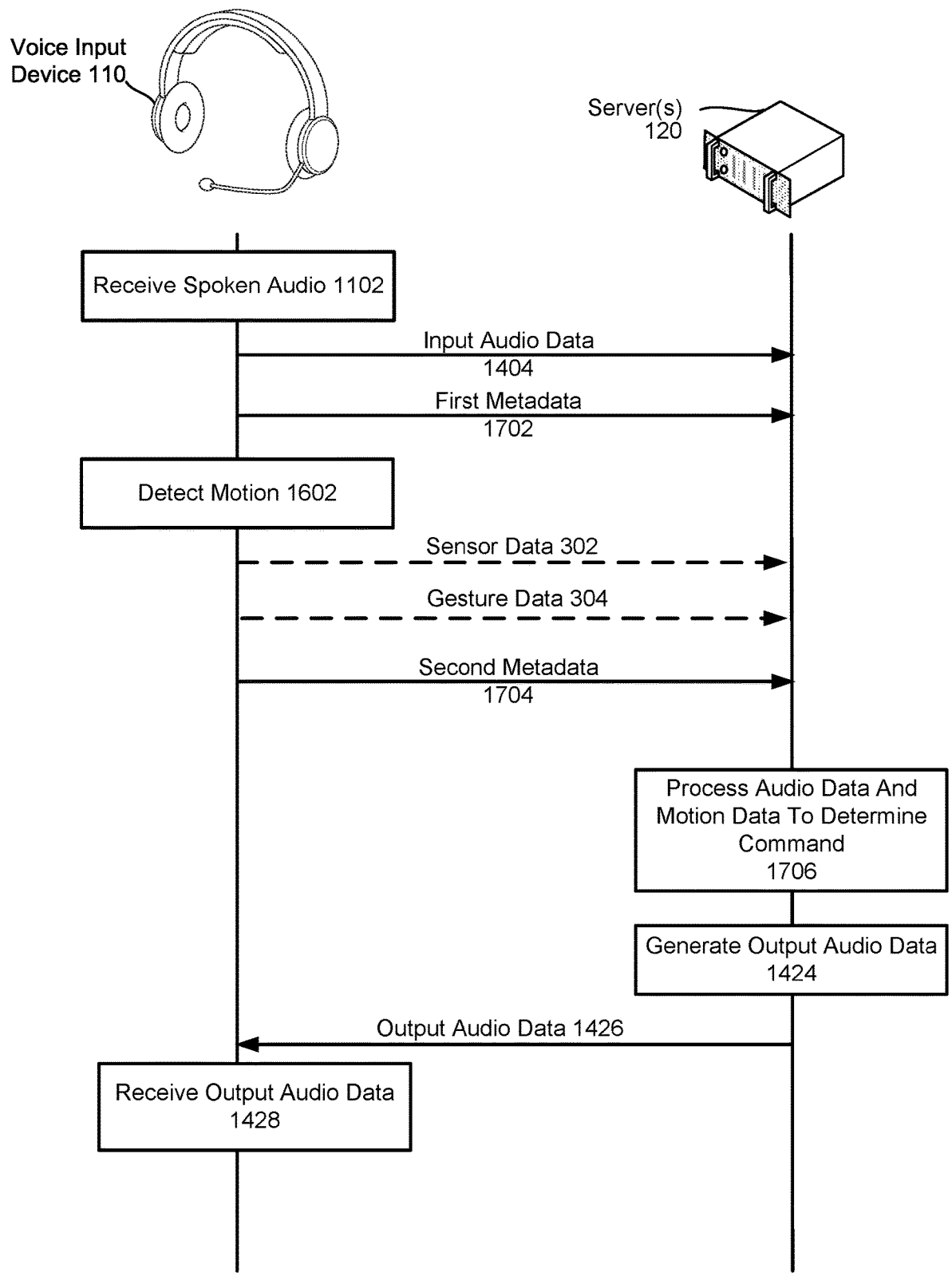
FIG. 17 illustrates using motion data to execute a command according to embodiments of the present disclosure.

The system may use a combination of audio data and linked motion data to determine a command. As shown in FIG. 17, a device 110 may receive (1102) spoken audio and send (1404) input audio data to the server 120. The device 110 may also send (1702) first metadata associated with the audio data to the server 120. The device may also send motion data to the server. For example, the device may detect (1602) motion using one or more sensors 630. The device 110 may then send motion data (e.g., sensor data 302 and/or gesture data 304) to the server 120. The device 110 may also send (1702) second metadata associated with the motion data to the server 120. The server(s) 120 may then process (1706) the audio data and the motion data to determine a command. The server may also process the first metadata and/or second metadata to determine the command. As part of the processing, the server may perform ASR on the audio data to determine text, perform NLU on the text data to obtain NLU output data and process the NLU output data and the motion data to determine the command. In one example, the motion data may be used to fill a slot associated with the NLU output data. For example, the NLU output data may indicate that the audio data corresponds to a command to play music, but may be incomplete in that it does not indicate what music to play. The system may process the motion data to determine what song should be played and thus can combine the audio data and the motion data to perform the command. In another example, the system can determine that the motion data corresponds to a movement at a beginning of an utterance using time data included in the metadata and thus can interpret the audio data in light of the motion data to determine what command to execute. In another example, the system may send the audio data for speech processing (e.g., ASR and/or NLU) while the motion data is sent to another component for interpretation, thus allowing the audio data and motion data to be processed substantially simultaneously by different components. The results of the processing may then be merged and processed to determine the command. The server 120 may then generate (1424) output audio data corresponding to the command and send (1426) the output audio data to the device 110, which then receives (1428) the output audio data and outputs corresponding audio.

In certain configurations of the system the system may store audio data corresponding to a particular movement gesture such that the stored audio data may be used by the speech processing system to execute a command with the speech processing system. For example, in a user profile 502 or other storage associated with a device 110 or the server(s) 120, a particular gesture may be associated with a particular audio sample. For example, a head nod gesture (for example as shown in FIG. 9C) may be associated with audio data corresponding to a user saying the word "yes." In another example, a head shake gesture (for example as shown in FIG. 9B) may be associated with audio data corresponding to a user saying the word "no." The audio data may correspond to the user speaking the word(s) associated with the gesture or may be stored according to some default audio (for example synthesized audio) corresponding to the words. Alternatively, or in addition, instead of pre-stored audio data the pre-stored data may be text data 300 associated with the gesture, for example the word "yes" for a head nod, the word "no" for a head shake, or the like. The pre-stored audio data and/or pre-stored text data 300 for a gesture may be stored on a device 110, or remotely, such as in remote storage associated with a server(s) 120. If the gesture is detected (either by the device 110 or by the server 110) the system can use the pre-stored data to execute a command. The pre-stored data may also correspond to a particular application, for example one set of pre-stored data may apply if a gesture is detected during operation of one particular application but a different set of pre-stored data may apply if the same gesture is detected during operation of a different application. (For example, a head nod during a general knowledge query prompt may correspond to "no" but a head nod during a music playing application may correspond to "volume up.")

Figure 18:
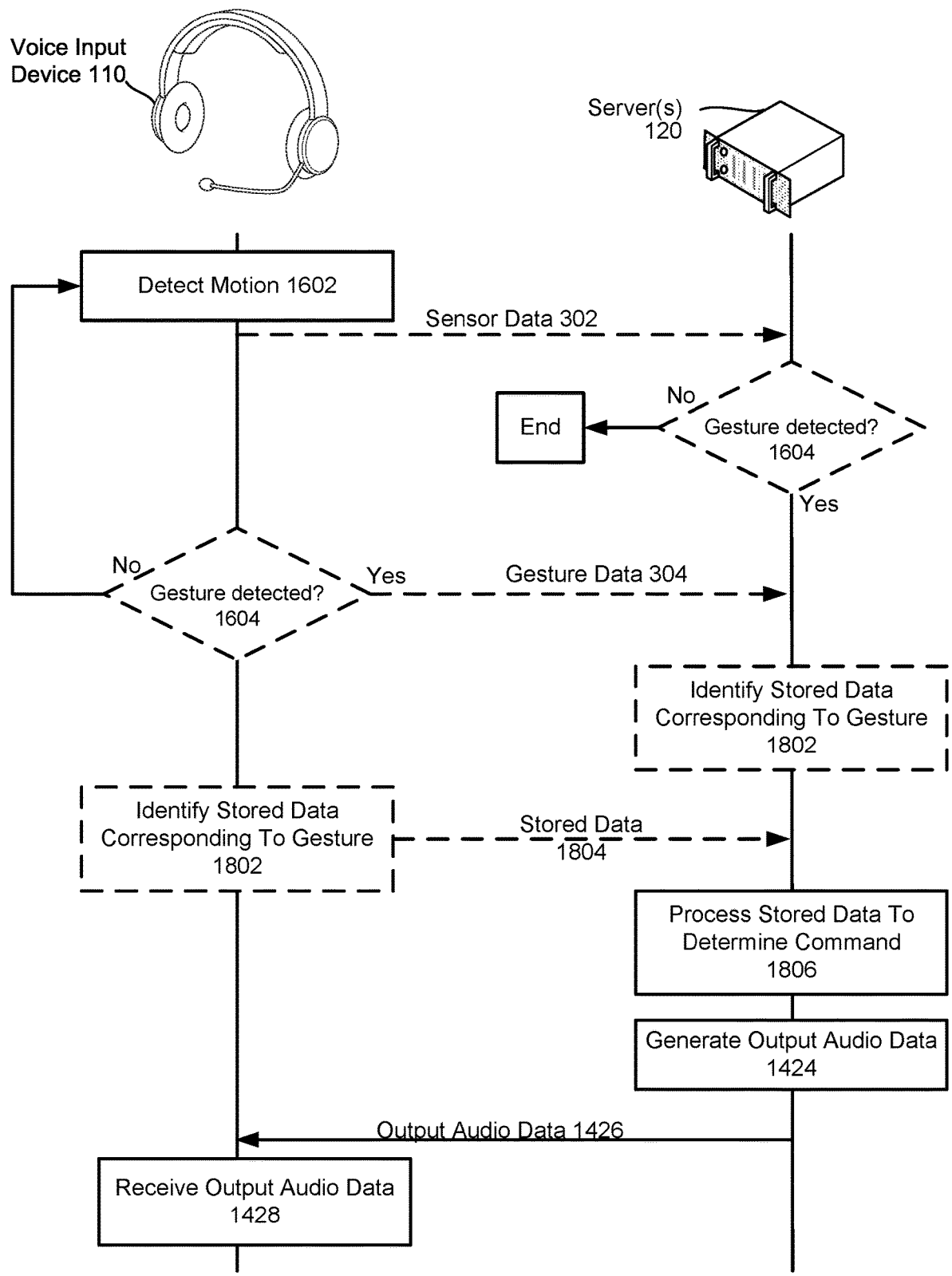
FIG. 18 illustrates using motion data to execute a command according to embodiments of the present disclosure.

As shown in FIG. 18, a device 110 may detect (1602) motion. The device may then send sensor data 302 corresponding to the motion to the server(s) 120. The server(s) 120 may then detect (1604:Yes) a gesture corresponding to the sensor data 302. Alternatively, the device may detect (1604:Yes) the gesture. The device 110 or server(s) 120 may then identify (1802) stored data corresponding to the gesture. The device 110 may then send (1804) the stored data to the server. The stored data may be audio data corresponding to the gesture, text data corresponding to the gesture, or some other data. The server(s) 120 may then process (1806) the stored data to determine a command, generate (1424) output audio data corresponding to the command and send (1426) the output audio data to the device 110, which then receives (1428) the output audio data and outputs corresponding audio.

In one configuration the system may be configured such that a particular motion gesture (for example the user vigorously shaking his or her head) may correspond to a "cancel" gesture that can be used to interrupt current system processing, for example if the system misinterprets another gesture or a particular utterance. Thus, if the system is engaged in certain operations the motion sensors 630 can detect motion corresponding to the gesture, which is translated into sensor data 302 that is interpreted by the gesture detection component 620 as the cancel gesture. The gesture detection component 620 can then notify another component or process to cancel current operations (such as playing back TTS output, executing a particular command, or the like).

Various machine learning techniques may be used to perform the training of various components, such as the wake command component 220/gesture detection component 620 to detect gestures, the ASR component 250/NLU component 260 in using motion data to perform ASR/NLU respectively, or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 19:
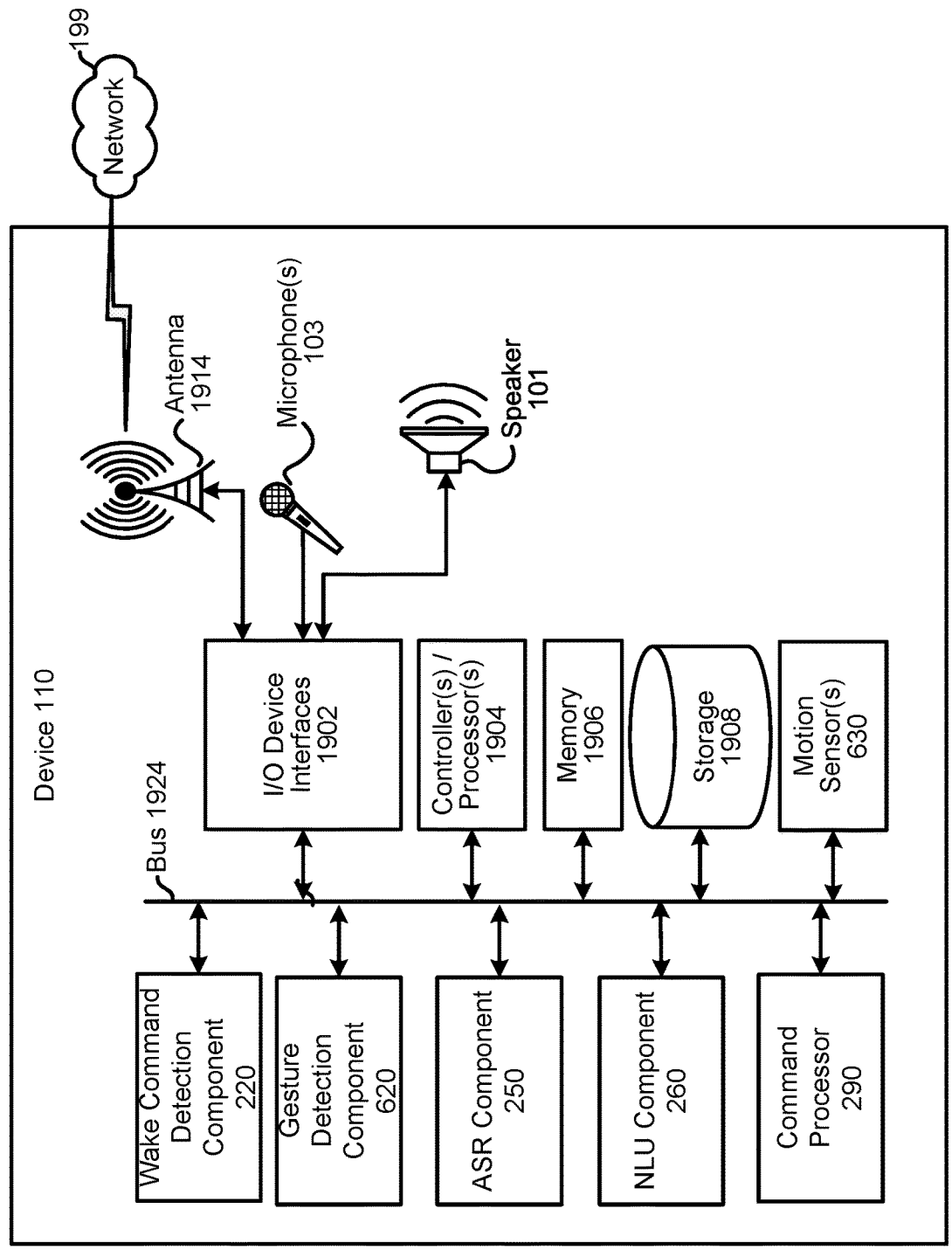
FIG. 19 is a block diagram conceptually illustrating example components of a voice input device according to embodiments of the present disclosure.
Figure 20:
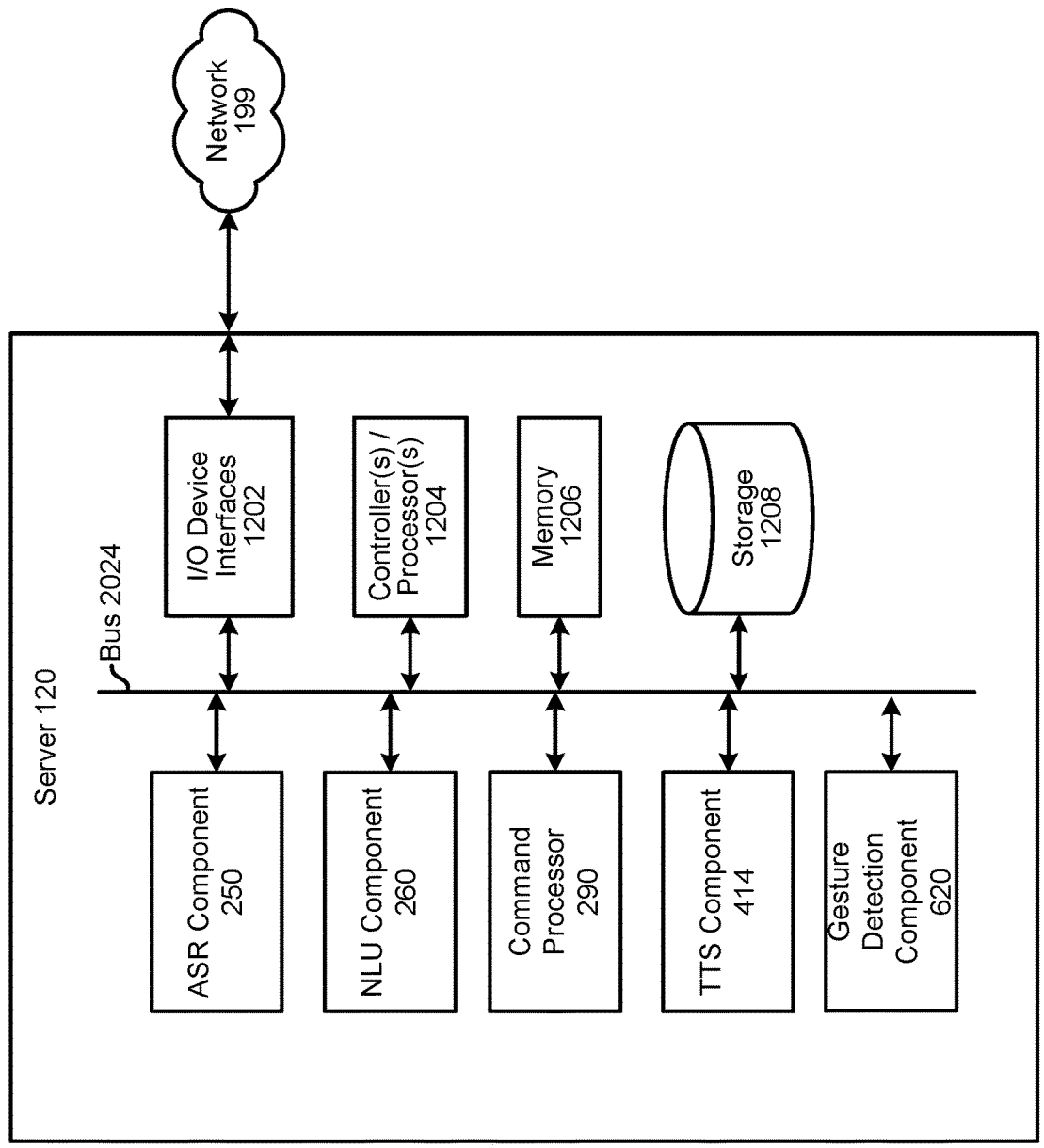
FIG. 20 is a block diagram conceptually illustrating example components of a server according to embodiments of the present disclosure.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 19 and 20, are exemplary, and may be located as a stand-alone device or may be included, in whole or in part, as a component of a larger device or system. For example, multiple different physical servers 120 may combine to perform ASR processing, multiple other different physical servers 120 may combine to perform NLU processing, or the like with various operations discussed herein.

FIG. 19 is a block diagram conceptually illustrating a user device 110 (for example voice input devices 110a and 110b as herein described) that may be used with the described system. FIG. 20 is a block diagram conceptually illustrating example components of a remote device, such as a remote server 120 that may assist with ASR processing, NLU processing, or command processing. Multiple such servers 120 may be included in the system, such as one server(s) 120 for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1904/2004), that may each include a central processing unit (CPU) for processing data and computer-readable instructions, and a memory (1906/2006) for storing data and instructions of the respective device. The memories (1906/2006) may individually include volatile random access memory (RAM), non-volatile read only memory (ROM), non-volatile magnetoresistive (MRAM) and/or other types of memory. Each device may also include a data storage component (1908/2008), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1902/2002).

Computer instructions for operating each device (110/120) and its various components may be executed by the respective device's controller(s)/processor(s) (1904/2004), using the memory (1906/2006) as temporary "working" storage at runtime. A device's computer instructions may be stored in a non-transitory manner in non-volatile memory (1906/2006), storage (1908/2008), or an external device(s). Alternatively, some or all of the executable instructions may be embedded in hardware or firmware on the respective device in addition to or instead of software.

Each device (110/120) includes input/output device interfaces (1902/2002). A variety of components may be connected through the input/output device interfaces (1902/2002), as will be discussed further below. Additionally, each device (110/120) may include an address/data bus (1924/2024) for conveying data among components of the respective device. Each component within a device (110/120) may also be directly connected to other components in addition to (or instead of) being connected to other components across the bus (1924/2024).

Referring to the device 110 of FIG. 19, the device 110 may include a display, which may comprise a touch interface configured to receive limited touch inputs. Or the device 110 may be "headless" and may primarily rely on spoken commands for input. For example, the device 110 may be a headset worn by a user. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1902 that connect to a variety of components such as a companion device (such as a tablet, phone, or the like) or to other components or devices. The device 110 may also include an audio capture component. The audio capture component may be, for example, a microphone 103 or array of microphones included in a headset or wireless headset. The microphone 103 may be configured to capture audio. If an array of microphones is included, approximate distance to a sound's point of origin may be determined by acoustic localization based on time and amplitude differences between sounds captured by different microphones of the array. The device 110 (using microphone 103, wake command detection component 220, ASR component 250, etc.) may be configured to determine audio data corresponding to detected audio data. The device 110 (using input/output device interfaces 1902, antenna 1914, etc.) may also be configured to transmit the audio data to server 120 for further processing or to process the data using internal components such as a wake command detection component 220.

For example, via the antenna(s) 1914, the input/output device interfaces 1902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 may include one or more motion sensors 630. As discussed above, the device 110 may include one or more motion sensors 630. The sensors 630 may be any appropriate motion sensor(s) capable of providing information about rotations and/or translations of the device, and may include electronic accelerometer(s) that may measure linear acceleration about three dimensions (such as, x-, y-, and z-axis), electronic gyroscope(s) that may measure rotational acceleration about three dimensions (e.g., roll, pitch, and yaw), inertial sensor(s), barometer(s), gravity sensor(s), electronic compass(es), inclinometer(s), magnetometer(s), proximity sensor(s), distance sensor(s), depth sensor(s), range finder(s), ultrasonic transceiver(s), global position system (GPS) or other location determining sensor(s) and/or the like. The device can be configured to monitor for a change in position and/or orientation of the device using these motion sensor(s) 630.

The motion sensor(s) may also include a pressure sensor to detect a change in pressure in an ear(s) of the user. For example, a pressure sensor may be in contact with a user's ear. The user may utter a word in which a jaw movement is detected by the pressure sensor such as movement in the inner ear lobe of the user. The pressure sensor may convert the detected jaw movement to motion data. The motion data corresponding to the jaw movement may be compared to a list of movement signatures saved in a database, for example by gesture detection component 620.

The device 110 may include at least one orientation- or rotation-determining element, such as an electronic compass or electronic gyroscope, that is able to determine a frame of reference in two or three dimensions with respect to a first orientation of the device. In at least some embodiments, an electronic compass might be used to determine an axis of the frame of reference, as may correspond to a North direction, etc. In other embodiments, a component such as an electronic gyroscope might be calibrated periodically with a component such as a compass, but might instead determine changes in orientation about three axes of rotation over time. Various other approaches to determining changes in orientation about one, two, or three axes of rotation can be used as well within the scope of the various embodiments.

In some embodiments, the determination of a frame of reference or orientation can be triggered by receiving input to capture motion data or another such action, but in other embodiments the frame of reference and/or orientation information can be updated periodically, such as several times a second based upon the type and/or configuration of the electronic gyroscope. A gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein. The electronic gyroscope (or other such component or embedded sensor) can detect the change in orientation, such as a change corresponding to a change in an angle of a device with respect to the calculated frame of reference. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc.

In some embodiments, a computing device can include types of imaging elements, such as ambient light sensors, IR sensors, and other optical, light, imaging, or photon sensors that may be used to detect movement of a user that may not otherwise be detectable by motion sensor(s) (such as movement of a user's hand if device 110 is worn on a user's head). In some embodiments, multiple image-based user detection and/or gesture tracking processes can be executed simultaneously, other motion determination techniques can be performed, and/or other sensor data analyzed for detecting and tracking movement of a user and/or the device 110. The data obtained by these independent processes can be aggregated for more robustly detecting a gesture. In various embodiments, sensor fusion techniques can be used to combine data from multiple sensors of a computing device. Sensor fusion can be used to aggregate data captured by multiple sensors or input devices, such as multiple cameras, inertial sensors, infrared transceivers, GPS, microphones, etc., to obtain information of a state of an object of interest that may be more accurate and/or complete than would be possible from a single sensor alone. For example, conventional cameras may be limited to capturing 2-D images of objects of interest. However, images captured by multiple cameras with different fields of view can be used to analyze the object of interest in three dimensions. As another example, a conventional three-axis accelerometer may be limited to measuring linear acceleration about three dimensions (e.g., x-, y-, and z-axis) while a three-axis gyroscope may be limited to measuring rotational acceleration about three dimensions (e.g., roll, pitch, and yaw). By implementing sensor fusion, the sensor data captured by the accelerometer and the gyroscope can be used to derive motion according to six dimensions or six degrees of freedom (6 DOF). As yet another example, sensor fusion can be applied to aggregate motion and/or position of an object of interest evaluated using image analysis and motion and/or position derived from inertial sensor data.

The device 110 may include a gesture detection component 620 which may perform various operations discussed above.

In other embodiments, detection of a gesture can be based on input data captured using one or more sensors or other input devices of a computing system. For instance, a proximity sensor can be used to estimate an initial position of an object of interest with respect to the device. An accelerometer can measure the acceleration of a device and the change in the position of the device can be derived via double integration of the data obtained from the accelerometer. A gyroscope can measure the rate of change of the device's orientation (i.e., angular velocity) and the change in angular position of the device can be calculated by integration of the measured velocity. Fusion of the input data obtained by the accelerometer and gyroscope may provide updated information regarding movement of the computing device.

The device 110 and/or server 120 may include an ASR component 250. The ASR component in device 110 may be of limited or extended capabilities. The ASR component 250 may include the language models 254 stored in ASR model storage component 252, and an ASR component 250 that performs the automatic speech recognition process. If limited speech recognition is included, the ASR component 250 may be configured to identify a limited number of words, such as keywords detected by the device, whereas extended speech recognition may be configured to recognize a much larger range of words.

The device 110 and/or server 120 may include a limited or extended NLU component 260. The NLU component in device 110 may be of limited or extended capabilities. The NLU component 260 may comprising the name entity recognition component 262, the intent classification component 264 and/or other components. The NLU component 260 may also include a stored knowledge base and/or entity library, or those storages may be separately located.

The device 110 and/or server 120 may also include a command processor 290 that is configured to execute commands/functions associated with a spoken command as described above.

The device 110 may include a wake command detection component 220, which may be a separate component or may be included in an ASR component 250. The wake command detection component 220 receives audio signals and detects occurrences of a particular expression (such as a configured keyword) in the audio as explained above.

To create output speech, the server 120 may be configured with a text-to-speech ("TTS") component 414 that transforms text data into audio data representing speech as explained above.

Figure 21:
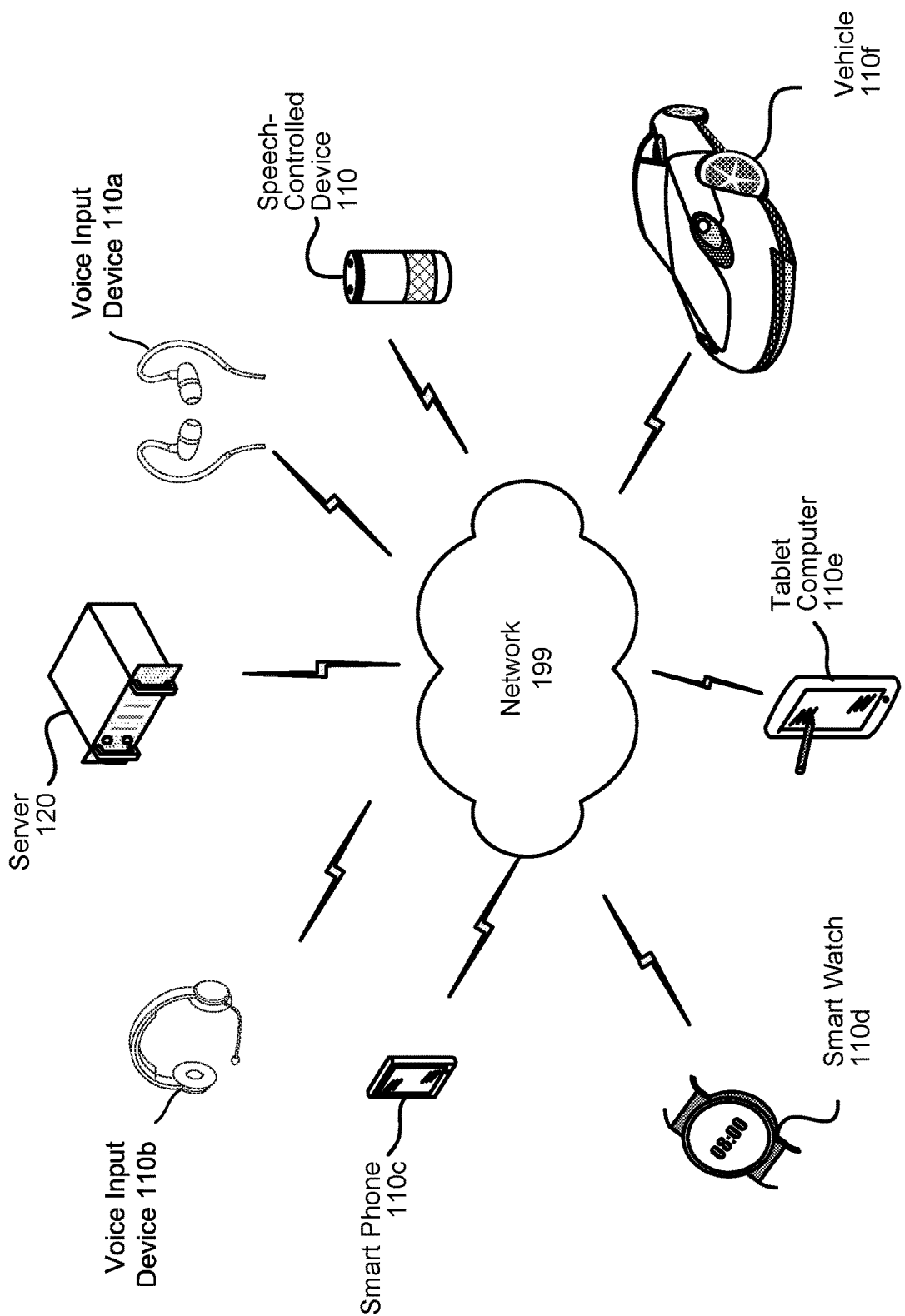
FIG. 21 illustrates an example of a computer network for use with the system.

As illustrated in FIG. 21 multiple devices (120, 110, 110c-110f) may contain components of the system 100 and the devices may be connected over a network 199. Network 199 may include a local or private network or may include a wide network such as the Internet. Devices may be connected to the network 199 through either wired or wireless connections. For example, a voice input device 110, a tablet computer 110e, a smart phone 110c, a smart watch 110d, and/or a vehicle 110f may be connected to the network 199 through a wireless service provider, over a WiFi or cellular network connection or the like. Other devices are included as network-connected support devices, such as a server 120, application developer devices, or others. The support devices may connect to the network 199 through a wired connection or wireless connection. Networked devices 110 may capture audio using one-or-more built-in or connected microphones 103 or audio capture devices, with processing performed by ASR, NLU, or other components of the same device or another device connected via network 199, such as an ASR 250, NLU 260, etc. of one or more servers 120. Audio data 111, sensor data 302, gesture data 304, and/or time data 306 may be sent to different physical devices depending on the system configuration.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, various aspects of the configurations and embodiments disclosed herein may be combined in whole or in part.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A device comprising:
at least one motion sensor;
at least one microphone;
at least one processor; and
at least one memory comprising instructions that, when executed by the at least one processor, cause the device to:
receive, from the at least one motion sensor, motion data corresponding to motion of the device, wherein the device is attached to a body part;
determine, based at least in part on processing by a model, that the motion of the device about a first axis corresponds to the motion of the body part about the first axis;
determine the motion data corresponds to a wake gesture;
determine input audio data based at least on an utterance captured by the at least one microphone;
determine the wake gesture is associated with a command to perform speech processing; and
based at least in part on association between the wake gesture and the command, send the input audio data to at least one speech processing component.

2. The device of claim 1, wherein the instructions that cause the device to determine that the motion data corresponds to a wake gesture comprise instructions that, when executed by the at least one processor, cause the device to:
process the motion data with respect to stored data corresponding to the wake gesture.

3. The device of claim 1, wherein the at least one memory further comprises instructions that, when executed by the at least one processor, cause the device to:
send the input audio data to at least one remote device comprising the at least one speech processing component.

4. The device of claim 3, wherein the at least one memory further comprises instructions that, when executed by the at least one processor, cause the device to:
send, to the at least one remote device, a portion of motion data.

5. The device of claim 4, wherein the at least one memory further comprises instructions that, when executed by the at least one processor, cause the device to:
send, to the at least one remote device, time data corresponding to the portion of motion data.

6. The device of claim 3, wherein the at least one memory further comprises instructions that, when executed by the at least one processor, cause the device to:
receive, from the at least one motion sensor, second motion data;

determine the second motion data corresponds to a second gesture; and send, to the at least one remote device, data indicating the second gesture.

7. The device of claim 6, wherein the at least one memory further comprises instructions that, when executed by the at least one processor, cause the device to:

send, to the at least one remote device, a device identifier corresponding to the device.

8. The device of claim 1, wherein the motion data represents the device rotating about at least one axis.

9. The device of claim 1, wherein the device further comprises at least one visual indicator and wherein the at least one memory further comprises instructions that, when executed by the at least one processor, cause the device to:

in response to the motion data corresponding to the wake gesture, provide an output using the at least one visual indicator to indicate a connection with a second device.

10. The device of claim 1, wherein the at least one memory further comprises instructions that, when executed by the at least one processor, cause the device to:

determine the input audio data after determining the motion data corresponds to a wake gesture.

11. A computer-implemented method comprising:

receiving, from at least one motion sensor of a device, motion data corresponding to motion of the device, wherein the device is attached to a body part;

determining, based at least in part on processing by a model, that the motion of the device about a first axis corresponds to the motion of the body part about the first axis;

determining the motion data corresponds to a wake gesture;

determining input audio data based at least on an utterance captured by at least one microphone of the device;

determining the wake gesture is associated with a command to perform speech processing; and based at least in part on association between the wake gesture and the command, sending the input audio data from the device to at least one speech processing component.

12. The computer-implemented method of claim 11, further comprising:

processing the motion data with respect to stored data corresponding to the wake gesture.

13. The computer-implemented method of claim 11, further comprising:

sending the input audio data to at least one remote device comprising the at least one speech processing component.

14. The computer-implemented method of claim 13, further comprising:

sending, to the at least one remote device, a portion of motion data.

15. The computer-implemented method of claim 14, further comprising:

sending, to the at least one remote device, time data corresponding to the portion of motion data.

16. The computer-implemented method of claim 13, further comprising:

receiving, from the at least one motion sensor, second motion data;

determining the second motion data corresponds to a second gesture; and sending, to the at least one remote device, data indicating the second gesture.

17. The computer-implemented method of claim 16, further comprising:

sending, to the at least one remote device, a device identifier corresponding to the device.

18. The computer-implemented method of claim 11, further comprising:

determining that the motion data represents the device rotating about at least one axis.

19. The computer-implemented method of claim 11, wherein the device further comprises at least one visual indicator and wherein the method further comprises:

in response to the motion data corresponding to the wake gesture, providing an output using the at least one visual indicator to indicate a connection with a second device.

20. The computer-implemented method of claim 11, further comprising:

determining the input audio data after determining the motion data corresponds to a wake gesture.

* * * * *